(12) United States Patent
Lau

(10) Patent No.: US 12,440,206 B2
(45) Date of Patent: Oct. 14, 2025

(54) CONTROLLED TISSUE ANCHOR SPACING

(71) Applicant: Edwards Lifesciences Corporation, Irvine, CA (US)

(72) Inventor: Jackie P. Lau, Anaheim, CA (US)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 1087 days.

(21) Appl. No.: 17/401,248

(22) Filed: Aug. 12, 2021

(65) Prior Publication Data

US 2021/0369266 A1    Dec. 2, 2021

Related U.S. Application Data

(63) Continuation of application No. PCT/US2020/016843, filed on Feb. 5, 2020.

(60) Provisional application No. 62/804,710, filed on Feb. 12, 2019.

(51) Int. Cl.
*A61B 17/04* (2006.01)
*A61B 17/00* (2006.01)
*A61F 2/24* (2006.01)

(52) U.S. Cl.
CPC ...... *A61B 17/0482* (2013.01); *A61B 17/0401* (2013.01); *A61B 2017/00243* (2013.01); *A61B 2017/00783* (2013.01); *A61B 2017/0409* (2013.01); *A61B 2017/0464* (2013.01); *A61F 2/2466* (2013.01)

(58) Field of Classification Search
CPC ...... A61B 17/0104; A61B 2017/34051; A61B 2017/3445; A61B 2017/00477; A61B 2017/3405; A61B 2017/0409; A61B 2017/0446; A61B 17/3421; A61B 17/0482; A61B 17/0469; A61F 2/2442; A61F 2/2448; A61F 2/2451; A61F 2/2454; A61F 2/2457; A61F 2/246; A61F 2/2463

See application file for complete search history.

(56) References Cited

U.S. PATENT DOCUMENTS

| 3,131,957 A | 5/1964 | Musto |
| 3,752,516 A | 8/1973 | Mumma |
| 4,403,797 A | 9/1983 | Ragland |
| 4,662,376 A | 5/1987 | Belanger |

(Continued)

FOREIGN PATENT DOCUMENTS

| EP | 0791330 A3 | 11/1997 |
| EP | 3505077 A1 | 7/2019 |

(Continued)

OTHER PUBLICATIONS

Alfieri, O. et al., "The double-orifice technique in mitral valve repair: a +A198:A225simple solution for complex problems," (2001) J. Thorac. Cardiovasc. Surg., 122(4):674-681.

(Continued)

*Primary Examiner* — Darwin P Erezo
*Assistant Examiner* — Mitchell Brian Hoag
(74) *Attorney, Agent, or Firm* — Chang and Hale LLP

(57) ABSTRACT

An anchor guide includes an elongate shaft, an atraumatic tip, a channel defined at least in part by the elongate shaft and configured to retain a suture associated with an anchor, and a spacing feature configured to provide a spacing distance between the channel and a device disposed in physical contact with the spacing feature.

14 Claims, 15 Drawing Sheets

(56) References Cited

U.S. PATENT DOCUMENTS

| | | |
|---|---|---|
| 4,807,625 A | 2/1989 | Singleton |
| 5,144,961 A | 9/1992 | Chen et al. |
| 5,147,316 A | 9/1992 | Castillenti |
| 5,312,423 A | 5/1994 | Rosenbluth et al. |
| 5,391,176 A | 2/1995 | de la Torre |
| 5,405,352 A | 4/1995 | Weston |
| 5,454,821 A | 10/1995 | Harm et al. |
| 5,472,446 A | 12/1995 | de la Torre |
| 5,507,754 A | 4/1996 | Green et al. |
| 5,527,323 A | 6/1996 | Jervis et al. |
| 5,554,184 A | 9/1996 | Machiraju |
| 5,626,614 A | 5/1997 | Hart |
| 5,643,293 A | 7/1997 | Kogasaka et al. |
| 5,681,331 A | 10/1997 | de la Torre et al. |
| 5,716,368 A | 2/1998 | de la Torre et al. |
| 5,727,569 A | 3/1998 | Benetti et al. |
| 5,728,109 A | 3/1998 | Schulze et al. |
| 5,746,752 A | 5/1998 | Burkhart |
| 5,749,889 A * | 5/1998 | Bacich ............... A61B 17/3421 606/198 |
| 5,769,862 A | 6/1998 | Kammerer et al. |
| 5,797,928 A | 8/1998 | Kogasaka |
| 5,824,065 A | 10/1998 | Gross |
| 5,931,868 A | 8/1999 | Gross |
| 5,957,936 A | 9/1999 | Yoon et al. |
| 5,971,447 A | 10/1999 | Steck |
| 6,010,531 A | 1/2000 | Donlon et al. |
| 6,074,417 A | 6/2000 | Peredo |
| 6,269,819 B1 | 8/2001 | Oz et al. |
| 6,332,893 B1 | 12/2001 | Mortier et al. |
| 6,562,051 B1 | 5/2003 | Bolduc et al. |
| 6,626,930 B1 | 9/2003 | Allen et al. |
| 6,629,534 B1 | 10/2003 | St. Goar et al. |
| 6,752,810 B1 | 6/2004 | Gao et al. |
| 6,840,246 B2 | 1/2005 | Downing |
| 6,921,408 B2 | 7/2005 | Sauer |
| 6,940,246 B2 | 9/2005 | Mochizuki et al. |
| 6,978,176 B2 | 12/2005 | Lattouf |
| 6,991,635 B2 | 1/2006 | Takamoto et al. |
| 6,997,950 B2 | 2/2006 | Chawla |
| 7,112,207 B2 | 9/2006 | Allen et al. |
| 7,291,168 B2 | 11/2007 | Macoviak et al. |
| 7,294,148 B2 | 11/2007 | McCarthy |
| 7,309,086 B2 | 12/2007 | Carrier |
| 7,316,706 B2 | 1/2008 | Bloom et al. |
| 7,373,207 B2 | 5/2008 | Lattouf |
| 7,431,692 B2 | 10/2008 | Zollinger et al. |
| 7,513,908 B2 | 4/2009 | Lattouf |
| 7,534,260 B2 | 5/2009 | Lattouf |
| 7,608,091 B2 | 10/2009 | Goldfarb et al. |
| 7,608,092 B1 * | 10/2009 | Schaffhausen ..... A61B 17/0401 606/232 |
| 7,618,449 B2 | 11/2009 | Tremulis et al. |
| 7,632,308 B2 | 12/2009 | Loulmet |
| 7,635,386 B1 | 12/2009 | Gammie |
| 7,666,196 B1 | 2/2010 | Miles |
| 7,744,609 B2 | 6/2010 | Allen et al. |
| 7,837,727 B2 | 11/2010 | Goetz et al. |
| 7,871,368 B2 | 1/2011 | Zollinger et al. |
| 7,871,433 B2 | 1/2011 | Lattouf |
| 7,959,650 B2 | 6/2011 | Kaiser et al. |
| 8,029,518 B2 | 10/2011 | Goldfarb et al. |
| 8,029,565 B2 | 10/2011 | Lattouf |
| 8,043,368 B2 | 10/2011 | Crabtree |
| 8,147,542 B2 | 4/2012 | Maisano et al. |
| 8,187,323 B2 | 5/2012 | Mortier et al. |
| 8,226,711 B2 | 7/2012 | Mortier et al. |
| 8,241,304 B2 | 8/2012 | Bachman |
| 8,252,050 B2 | 8/2012 | Maisano et al. |
| 8,292,884 B2 | 10/2012 | Levine et al. |
| 8,303,622 B2 | 11/2012 | Alkhatib |
| 8,333,788 B2 | 12/2012 | Maiorino |
| 8,337,525 B2 * | 12/2012 | Stone ................... A61B 17/04 606/232 |
| 8,382,829 B1 | 2/2013 | Call et al. |
| 8,439,969 B2 | 5/2013 | Gillinov et al. |
| 8,454,656 B2 | 6/2013 | Tuval |
| 8,465,500 B2 | 6/2013 | Speziali |
| 8,475,525 B2 | 7/2013 | Maisano et al. |
| 8,500,800 B2 | 8/2013 | Maisano et al. |
| 8,608,758 B2 | 12/2013 | Singhatat et al. |
| 8,663,278 B2 | 3/2014 | Mabuchi et al. |
| 8,771,296 B2 | 7/2014 | Nobles et al. |
| 8,784,439 B1 * | 7/2014 | Ward ............... A61B 17/06109 606/139 |
| 8,828,053 B2 | 9/2014 | Sengun et al. |
| 8,852,213 B2 | 10/2014 | Gammie et al. |
| 8,888,791 B2 | 11/2014 | Jaramillo et al. |
| 8,940,008 B2 | 1/2015 | Kunis |
| 9,131,884 B2 | 9/2015 | Holmes et al. |
| 9,192,287 B2 | 11/2015 | Saadat et al. |
| 10,462,363 B2 * | 10/2019 | Uemura ............... H04N 23/55 |
| 2002/0013571 A1 | 1/2002 | Goldfarb et al. |
| 2003/0023254 A1 | 1/2003 | Chiu |
| 2003/0094180 A1 | 5/2003 | Benetti |
| 2003/0105519 A1 | 6/2003 | Fasol et al. |
| 2003/0120264 A1 | 6/2003 | Lattouf |
| 2003/0120341 A1 | 6/2003 | Shennib et al. |
| 2004/0044365 A1 | 3/2004 | Bachman |
| 2004/0093023 A1 | 5/2004 | Allen et al. |
| 2004/0133230 A1 * | 7/2004 | Carpenter .......... A61B 17/0057 606/191 |
| 2004/0199183 A1 | 10/2004 | Oz et al. |
| 2005/0004667 A1 | 1/2005 | Swinford et al. |
| 2005/0019735 A1 | 1/2005 | Demas |
| 2005/0075654 A1 | 4/2005 | Kelleher |
| 2005/0119735 A1 | 6/2005 | Spence et al. |
| 2005/0149067 A1 | 7/2005 | Takemoto et al. |
| 2005/0149093 A1 | 7/2005 | Pokorney |
| 2005/0154402 A1 | 7/2005 | Sauer et al. |
| 2005/0216036 A1 | 9/2005 | Nakao |
| 2005/0216077 A1 | 9/2005 | Mathis et al. |
| 2005/0261710 A1 | 11/2005 | Sakamoto et al. |
| 2005/0267493 A1 | 12/2005 | Schreck et al. |
| 2006/0030866 A1 | 2/2006 | Schreck |
| 2006/0100698 A1 | 5/2006 | Lattouf |
| 2006/0111739 A1 | 5/2006 | Staufer et al. |
| 2006/0167541 A1 | 7/2006 | Lattouf |
| 2006/0190030 A1 | 8/2006 | To et al. |
| 2006/0247491 A1 * | 11/2006 | Vidlund ............ A61B 17/32053 623/2.37 |
| 2006/0282088 A1 | 12/2006 | Ryan |
| 2007/0001857 A1 | 1/2007 | Hartmann et al. |
| 2007/0049952 A1 | 3/2007 | Weiss |
| 2007/0055292 A1 | 3/2007 | Ortiz et al. |
| 2007/0112422 A1 | 5/2007 | Dehdashtian |
| 2007/0112425 A1 | 5/2007 | Schaller et al. |
| 2007/0118151 A1 | 5/2007 | Davidson |
| 2007/0118154 A1 | 5/2007 | Crabtree |
| 2007/0149995 A1 | 6/2007 | Quinn et al. |
| 2007/0197858 A1 | 8/2007 | Goldfarb et al. |
| 2007/0213582 A1 | 9/2007 | Zollinger et al. |
| 2007/0270793 A1 | 11/2007 | Lattouf |
| 2008/0004597 A1 | 1/2008 | Lattouf et al. |
| 2008/0009888 A1 | 1/2008 | Ewers et al. |
| 2008/0065120 A1 * | 3/2008 | Zannis ............... A61B 17/0469 606/222 |
| 2008/0065203 A1 | 3/2008 | Khalapyan |
| 2008/0140093 A1 | 6/2008 | Stone et al. |
| 2008/0167714 A1 | 7/2008 | St. Goar et al. |
| 2008/0188893 A1 | 8/2008 | Selvitelli et al. |
| 2008/0195126 A1 | 8/2008 | Solem |
| 2008/0228223 A1 | 9/2008 | Alkhatib |
| 2008/0249504 A1 | 10/2008 | Lattouf et al. |
| 2008/0269781 A1 | 10/2008 | Funamura et al. |
| 2009/0005863 A1 | 1/2009 | Goetz et al. |
| 2009/0043153 A1 | 2/2009 | Zollinger et al. |
| 2009/0069823 A1 * | 3/2009 | Foerster ............ A61B 17/0401 606/228 |
| 2009/0105729 A1 | 4/2009 | Zentgraf |
| 2009/0105751 A1 | 4/2009 | Zentgraf |
| 2009/0276038 A1 | 11/2009 | Tremulis et al. |
| 2010/0023056 A1 | 1/2010 | Johansson et al. |
| 2010/0023117 A1 | 1/2010 | Yoganathan et al. |

(56) References Cited

U.S. PATENT DOCUMENTS

| | | |
|---|---|---|
| 2010/0023118 A1 | 1/2010 | Medlock et al. |
| 2010/0042147 A1 | 2/2010 | Janovsky et al. |
| 2010/0174297 A1 | 7/2010 | Speziali |
| 2010/0179574 A1 | 7/2010 | Longoria et al. |
| 2010/0210899 A1 | 8/2010 | Schankereli |
| 2010/0298930 A1 | 11/2010 | Orlov |
| 2011/0015476 A1 | 1/2011 | Franco |
| 2011/0022083 A1 | 1/2011 | DiMatteo et al. |
| 2011/0022084 A1 | 1/2011 | Sengun et al. |
| 2011/0028995 A1 | 2/2011 | Miraki et al. |
| 2011/0029071 A1 | 2/2011 | Zlotnick et al. |
| 2011/0060407 A1 | 3/2011 | Ketai et al. |
| 2011/0106106 A1 | 5/2011 | Meier et al. |
| 2011/0144743 A1 | 6/2011 | Lattouf |
| 2011/0172767 A1* | 7/2011 | Rathi ............... A61B 17/0401 156/60 |
| 2011/0264208 A1 | 10/2011 | Duffy et al. |
| 2011/0270278 A1 | 11/2011 | Overes et al. |
| 2011/0288637 A1 | 11/2011 | De Marchena |
| 2011/0307055 A1 | 12/2011 | Goldfarb et al. |
| 2012/0004669 A1 | 1/2012 | Overes et al. |
| 2012/0143215 A1 | 6/2012 | Corrao et al. |
| 2012/0150223 A1 | 6/2012 | Manos et al. |
| 2012/0179184 A1 | 7/2012 | Orlov |
| 2012/0184971 A1 | 7/2012 | Zentgraf et al. |
| 2012/0203072 A1 | 8/2012 | Lattouf et al. |
| 2012/0226294 A1 | 9/2012 | Tuval |
| 2012/0226349 A1 | 9/2012 | Tuval et al. |
| 2012/0232339 A1* | 9/2012 | Csiky ............... A61B 1/018 604/95.04 |
| 2013/0018459 A1 | 1/2013 | Maisano et al. |
| 2013/0035757 A1 | 2/2013 | Zentgraf et al. |
| 2013/0253641 A1 | 9/2013 | Lattouf |
| 2013/0282059 A1 | 10/2013 | Ketai et al. |
| 2013/0345749 A1 | 12/2013 | Sullivan et al. |
| 2014/0031926 A1 | 1/2014 | Kudlik et al. |
| 2014/0039607 A1 | 2/2014 | Kovach |
| 2014/0067052 A1 | 3/2014 | Chau et al. |
| 2014/0114404 A1* | 4/2014 | Gammie ............... A61F 2/2457 623/2.11 |
| 2014/0148828 A1* | 5/2014 | Ewers ............... A61B 17/00234 606/153 |
| 2014/0214152 A1 | 7/2014 | Bielefeld |
| 2014/0243968 A1 | 8/2014 | Padala |
| 2014/0364938 A1 | 12/2014 | Longoria et al. |
| 2015/0032127 A1 | 1/2015 | Gammie et al. |
| 2015/0045879 A1 | 2/2015 | Longoria et al. |
| 2015/0223802 A1* | 8/2015 | Tegzes ............... A61F 2/2466 606/151 |
| 2015/0282806 A1* | 10/2015 | Jorgensen ............ A61B 17/0482 606/144 |
| 2016/0235486 A1* | 8/2016 | Larkin ............... A61B 34/20 |
| 2018/0214269 A1* | 8/2018 | Wilson ............... A61B 17/0401 |
| 2019/0175346 A1 | 6/2019 | Schaffner et al. |
| 2019/0298382 A1* | 10/2019 | Fung ............... A61B 17/3478 |
| 2020/0015971 A1* | 1/2020 | Brauon ............... A61B 17/0467 |
| 2020/0155315 A1 | 5/2020 | Zhang et al. |

FOREIGN PATENT DOCUMENTS

| | | |
|---|---|---|
| JP | 2013517110 A | 5/2013 |
| WO | 2004037463 A1 | 5/2004 |
| WO | 2006078694 A3 | 7/2006 |
| WO | 2006127509 A2 | 11/2006 |
| WO | 2007100268 A2 | 9/2007 |
| WO | 2007119057 A1 | 10/2007 |
| WO | 2008013869 A2 | 1/2008 |
| WO | 2008124110 A3 | 10/2008 |
| WO | 2008143740 A3 | 11/2008 |
| WO | 2009081396 A2 | 7/2009 |
| WO | 2010070649 A1 | 6/2010 |
| WO | 2010105046 A1 | 9/2010 |
| WO | 2012137208 A1 | 10/2012 |
| WO | 2013003228 A1 | 1/2013 |
| WO | 2014093861 A1 | 6/2014 |
| WO | 2015020816 A1 | 2/2015 |
| WO | 2016192481 A1 | 12/2016 |

OTHER PUBLICATIONS

Barbero-Marcial, M. et al., "Transxiphoid Approach Without Median Sternotomy for the Repair of Atrial Septal Defects," (1998) Ann. Thorac. Surg., 65(3):771-774.

Braunberger, E. et al., "Very long-term results (more than 20 years) of valve repair with Carpentier's Techniques in nonrheumatic mitral valve insufficiency," (2001) Circulation, 104:I-8-I-11.

Carpentier, Alain, "Cardiac valve surgery—the 'French correction'," The Journal of Thoracic and Cardiovascular Surgery, vol. 86, No. 3, Sep. 1983, 15 pages.

David, T. E. et al., "Mitral valve repair by replacement of chordae tendineae with polytetrafluoroethylene sutures," (1991) J. Thorac. Cardiovasc. Surg., 101 (3):495-501.

David, T. E. et al., "Replacement of chordae tendineae with Gore-Tex sutures: a ten-year experience," (1996) J. Heart Valve Dis., 5(4):352-355.

Doty, D. B. et al., "Full-Spectrum Cardiac Surgery Through a Minimal Incision: Mini-Sternotomy (Lower Half) Technique," (1998) Ann. Thorac. Surg., 65(2):573-577.

Duran, C. M. G. et al., "Techniques for ensuring the correct length of new mitral chords," (2003) J Heart Valve Dis., 12(2):156-161.

Eishi, K et al., "Long-term results of artificial chordae implantation in patients with mitral valve prolapse," (1997) J. Heart Valve Dis., 6(6):594-598.

Frater, R. W. M. et al., "Chordal replacement in mitral valve repair," (1990) Circulation, 82(suppl. IV):IV-125-IV-130.

Frater, R. W. M., "Anatomical rules for the plastic repair of a diseased mitral valve," (1964) Thorax. 19:458-464.

Huber, C.H. et al., "Direct Access Valve Replacement (DAVR)—are we entering a new era in cardiac surgery?" (2006) European Journal of Cardio-thoracic Surgery, 29:380-385.

Hvass, U. et al., "Papillary Muscle Sling: A New Functional Approach to Mitral Repair in Patients With Ischernic Left Ventricular Dysfunction and Functional Mitral Regurgitation," (2003) Ann. Thorac. Surg., 75:809-811.

Kasegawa, H. et al., "Simple method for determining proper length of artificial chordae in mitral valve repair," (1994) Ann. Thorac. Surg., 57(1 ):237-239.

Kobayashi, J. et al., "Ten-year experience of chordal replacement with expanded polytetrafluoroethylene in mitral valve repair," (2000) Circulation, 102(19 Suppl 3):III-30-III-34.

Kunzelman, K. et al., "Replacement of mitral valve posterior chordae tendineae with expanded polytetrafluorocthylcne suture: a finite element study," (1996) J. Card. Surg., 11(2):136-145.

Langer, F. et al., "Ring plus String: Papillary muscle repositioning as an adjunctive repair technique for ischemic mitral regurgitation," (2007) J. Thorac. Cardiovasc. Surg., 133( 1): 247-249.

Maisano, F. et al., "The double-orifice technique as a standardized approach to treat mitral regurgitation due to severe myxomatous disease: surgical technique," (2000) European Journal of Cardio-thoracic Surgery, 17(3):201-205.

Merendino, K. A. et al., "The open correction of rheumatic mitral regurgitation and/or stenosis with special reference to regurgitation treated by posterornedial annuloplasty utilizing a pump-oxygenator," (1959) Annals of Surgery, 150 (1 ):5-22.

Minatoya, K. et al., "Pathologic aspects of polytetrafluoroethylene sutures in human heart," ( 1996) Ann. Thorac. Surg., 61 (3 ):883-887.

Mohty, D. et al., "Very long-term survival and durability of mitral valve repair for mitral valve prolapse," (2001) Circulation, 104:I-1-I-7.

*Neochord, Inc.* v. *University of Maryland, BALTIMORE*, Case No. IPR2016-00208, Decision on Institution of Inter Parties Review,37 CFR §42. 108, Paper 6, Entered May 24, 2016, 28 pages.

*Neochord, Inc.* v. *University of Maryland, Baltimore*, Case No. IPR2016-00208, Declaration of Dr. Lishan Aklog, dated Nov. 17, 2015, 91 pages.

(56) References Cited

OTHER PUBLICATIONS

*Neochord, Inc. v. University of Maryland, Baltimore,* Case No. IPR2016-00208, Petition for inter ParlesReview of U.S. Pat. No. 7,635,386, dated Nov. 18, 2015, 65 pages.

Nigro, J. J. et al., "Neochordal repair of the posterior mitral leaflet," (2004) J. Thoraric. Cardiovasc. Surg., 127 (2):440-447.

Phillips, M. R. et al., "Repair of anterior leaflet mitral valve prolapse: chordal replacement versus chordal shortening," (2000) Ann. Thorac. Surg., 69(1 ):25-29.

Russo, M. J. et al.•Transapical Approach for Mitral Valve Repair during Insertion of a Left Ventricular Assist Device, Hindawi Publishing Corporation, The Scientific World Journal, vol. 2013, Article ID 925310, [online], Retrieved from the internet: <URL: http://dx.doi.org/J 0.1155/2013/92531 O> Apr. 11, 2013, 4 pages.

Sarsam, M.A. I., "Simplified technique for determining the length of artificial chordae in milral valve repair," (2002) Ann. Thorac. Surg., 73(5): 1659-1660.

Savage, E. B. et al., Use of mitral valve repair: analysis of contemporary United States experience reported to the society of thoracic surgeons national cardiac database, . . . (2003) Ann. Thorac. Surg., 75:820-825.

Speziali, G. et al., "Correction of Mitral Valve Regurgitation by Off-Pump, Transapical Placement of Artificial Chordae Tendinae, Results of the European TACT Trial," AATS 93rd Annual Meeting 2013, www.aats.org, 26 pages.

Suematsu, Y. et al., "Three-dimensional echo-guided beating heart surgery without cardiopulmonary bypass: Atrial septal defect closure in a swine model," (2005) J. Thorac. Cardiovasc. Surg., 130: 1348-1357.

Von Oppell, U. 0. et al., "Chordal replacement for both minimally invasive and conventional mitral valve surgery using premeasured Gore-Tex loops," (2000) Ann. Thorac. Surg., 70(6):2166-2168.

Zussa, C. et al., Artificial mitral valve chordae: experimental and clinical experience;• (1990) Ann. Thorac. Surg., 50 (3):367-373.

Zussa, C. et al., "Seven-year experience with chordal replacement with expanded polytetrafluoroethylene in floppy mitral valve," (1994) J. Thorac. Cardiovasc. Surg., 108(1):37-41.

Zussa, C. et al., "Surgical technique for artificial rnitral chordae implantation," (1991) Journal of Cardiac Surgery, 6 (4):432-438.

Zussa, C., "Artificial chordae," (1995) J. Heart Valve Dis., 4(2):S249-S256.

\* cited by examiner

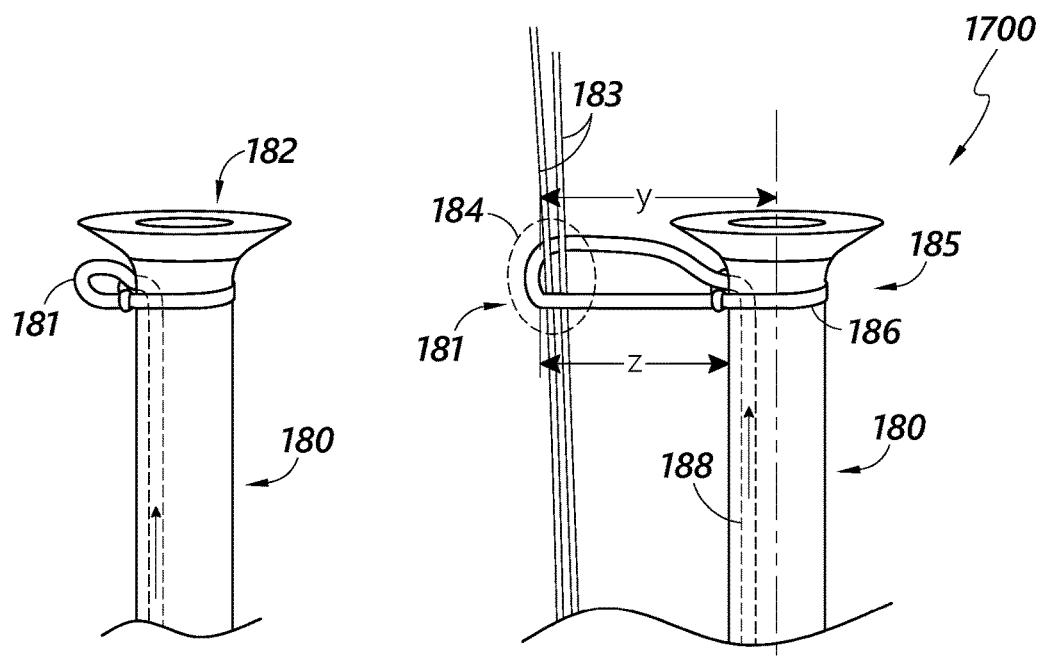
FIG. 18
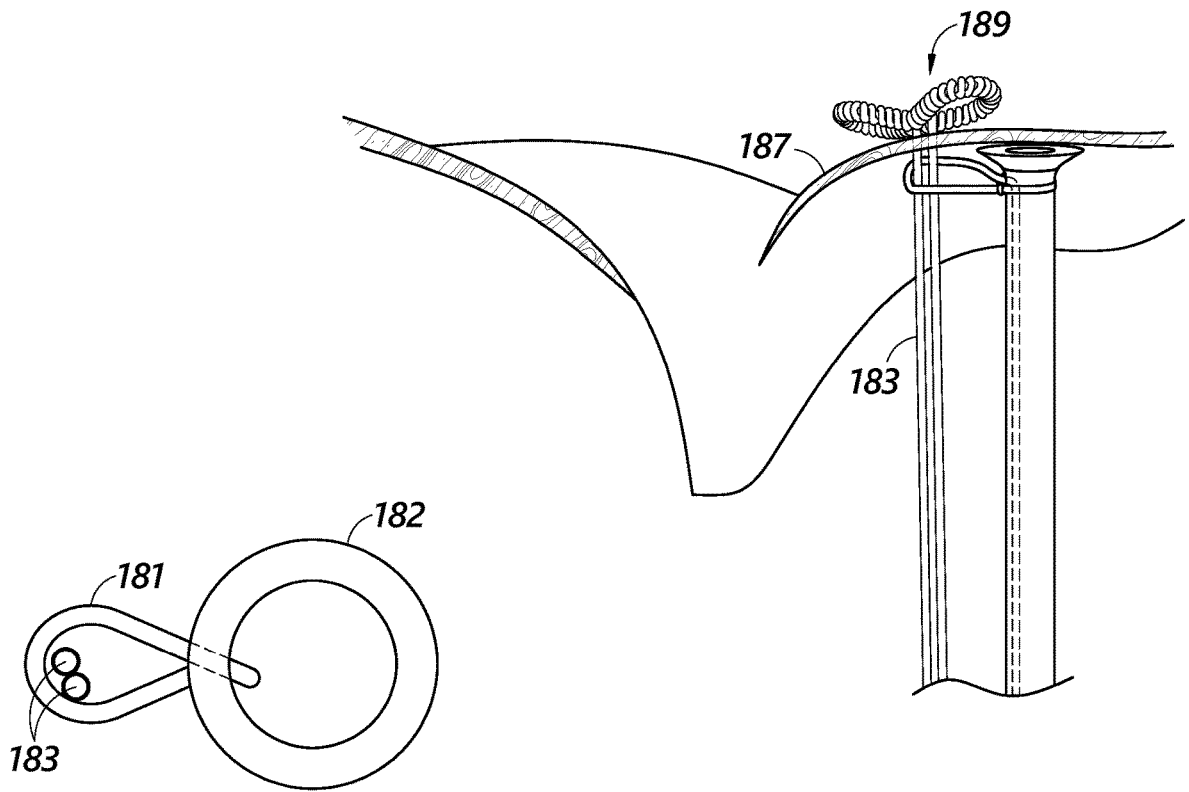
FIG. 19
FIG. 20

CONTROLLED TISSUE ANCHOR SPACING

CROSS REFERENCE TO RELATED APPLICATIONS

This application is a continuation of International Patent Application No. PCT/US20/16843, filed Feb. 5, 2020, which claims the benefit of U.S. Patent Application No. 62/804,710, filed Feb. 12, 2019, the entire disclosures all of which are incorporated by reference for all purposes.

BACKGROUND

Technical Field

The disclosure herein relates to cardiac valve repairs, and more particularly to surgical suture placement in connection with minimally invasive valve repair operations.

Description of Related Art

Various surgical operations involve the placement of suture anchors or knots. Improper placement of such suture anchors or knots can result in adverse health complications.

SUMMARY

Described herein are one or more methods and/or devices to facilitate controlled spacing of adjacent tissue anchors deployed onto a heart valve leaflet, such as the mitral valve leaflet, during a minimally invasive heart valve repair procedure performed while the heart is beating.

In some implementations, the present disclosure relates to an anchor guide comprising an elongate shaft, an atraumatic tip, a channel defined at least in part by the elongate shaft and configured to retain a suture associated with an anchor, and a spacing feature configured to provide a spacing distance between the channel and a device disposed in physical contact with the spacing feature.

The device can comprise a lumen member of an anchor delivery system. In some embodiments, the spacing feature comprises one or more flanges. The elongate shaft can have a circular segment cross-section. The spacing feature can be associated with the atraumatic tip. In some embodiments, the atraumatic tip is C-shaped. The elongate shaft can comprise echogenic material. For example, the echogenic material can be grit-blasted stainless steel. In some embodiments, the anchor guide comprises a hemostasis valve.

In some implementations, the present disclosure relates to a tissue-anchoring system comprising an anchor delivery device configured to anchor a first anchor at a first location in a heart valve leaflet, the anchor delivery device comprising an elongate lumen member configured to allow the first anchor to be advanced therethrough, and an anchor guide comprising an elongate shaft including one or more engagement features configured to provide sliding engagement between the elongate shaft of the anchor guide and the elongate lumen member of the anchor delivery device, the elongate shaft defining a space configured to receive a suture associated with a second anchor anchored in the heart valve leaflet. A dimension of the anchor guide controls a distance between the first anchor and the second anchor when the anchor guide is disposed against the leaflet and aligned with the second anchor and the anchor delivery device is disposed against the leaflet against the one or more engagement features of the elongate shaft.

In some embodiments, the elongate shaft has a semi-circle shape and the one or more engagement features comprise a plurality of flange features associated with a diametrical barrier of the elongate shaft. The distance between the first anchor and the second anchor can be approximately 5 millimeters (mm). In some embodiments, the engagement features comprise a pair of opposing flanges extending from at least a portion of a length of the elongate shaft and the elongate lumen member of the anchor delivery device is shaped to be positioned between and in contact with the pair of opposing flanges. The elongate lumen member of the anchor delivery device can comprise a corresponding pair of opposing grooves configured to engage with the pair of opposing flanges. The elongate shaft can be extendable and retractable. In some embodiments, the space defined by the elongate shaft extends along an entire length of the elongate shaft. The anchor guide can comprise an echogenic material.

In some implementations, the present disclosure relates to a method of deploying a tissue anchor in a heart valve leaflet. The method comprises disposing one or more suture tails associated with a tissue anchor anchored in a heart valve leaflet of a heart within a channel of an anchor guide, the one or more suture tails passing through an access opening in a wall of a ventricle of the heart, inserting the anchor guide through the access opening at least partially into the ventricle, advancing the anchor guide to contact a first location on a proximal side of the heart valve leaflet, the first location being aligned with a first anchor associated with the one or more suture tails, inserting an anchor delivery device at least partially into the ventricle, advancing the anchor delivery device to contact a second location on the of the heart valve leaflet while engaging the anchor delivery device with one or more engagement features of the anchor guide, and deploying a second tissue anchor at the second location using the anchor delivery device, wherein a distance between the first location and the second location is based on a dimension of the one or more engagement features.

Inserting the anchor delivery device can be done through the access opening. In some embodiments, advancing the anchor delivery device to contact the second location of the heart valve leaflet comprises maintaining a sliding engagement between the anchor delivery device and the one or more engagement features of the anchor guide. Advancing the anchor guide to contact the first location can comprise contacting the heart valve leaflet with a floating distal tip of the anchor guide and maintaining contact with the heart valve leaflet while extending the anchor delivery device. In some embodiments, the ventricle is a left ventricle and the heart valve leaflet is a mitral valve leaflet.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of the disclosure. In addition, various features of different disclosed embodiments can be combined to form additional embodiments, which are part of this disclosure. Throughout the drawings, reference numbers may be reused to indicate correspondence between reference elements. However, it should be understood that the use of similar reference numbers in connection with multiple drawings does not necessarily imply similarity between respective embodiments associated therewith. Furthermore, it should be understood that the features of the respective drawings are not necessarily drawn to scale, and the illustrated sizes thereof are presented for the purpose of illustration of inventive aspects thereof. Generally, certain of the illustrated features may be relatively smaller than as illustrated in some embodiments or configurations.

FIGS. 8-1 through 8-3 illustrate a suture placement system and associated cardiac anatomy at one or more stages of an anchor deployment process in accordance with one or more embodiments.

FIGS. 9-1 through 9-3 illustrate a suture placement system and associated cardiac anatomy at one or more stages of an anchor deployment process in accordance with one or more embodiments.

FIGS. 10-1 through 10-3 illustrate a suture placement system and associated cardiac anatomy at one or more stages of an anchor deployment process in accordance with one or more embodiments.

FIGS. 11-1 through 11-3 illustrate a suture placement system and associated cardiac anatomy at one or more stages of an anchor deployment process in accordance with one or more embodiments.

FIGS. 12-1 through 12-3 illustrate a suture placement system and associated cardiac anatomy at one or more stages of an anchor deployment process in accordance with one or more embodiments.

FIGS. 13-1 through 13-3 illustrate a suture placement system and associated cardiac anatomy at one or more stages of an anchor deployment process in accordance with one or more embodiments.

FIG. 18 is a close-up view of a suture spacing system in accordance with one or more embodiments.

FIG. 19 is a top view of a suture spacing system in accordance with one or more embodiments.

FIG. 20 is a side view of a suture spacing system and associated anatomy in accordance with one or more embodiments.

DETAILED DESCRIPTION

Figure 1:
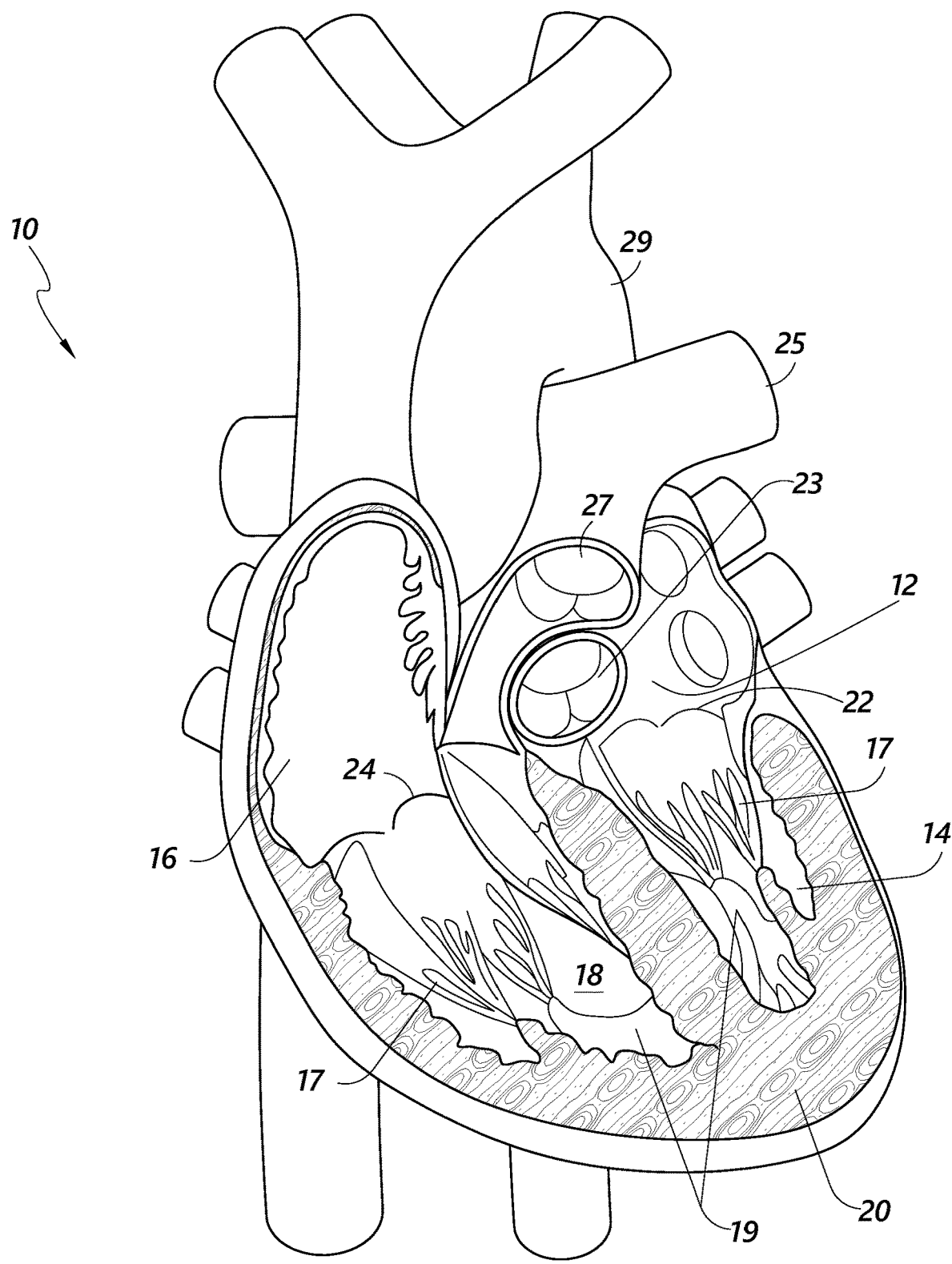
FIG. 1 is a cut-away anterior view of a heart.

The headings provided herein are for convenience only and do not necessarily affect the scope or meaning of the claims.

Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Embodiments of the present disclosure provide solutions relating to the treatment of certain structural heart conditions with valve leaflet anchors having controlled spacing. Various disease processes can impair the proper functioning of one or more of the valves of the heart. These disease processes include degenerative processes (e.g., Barlow's Disease, fibroelastic deficiency), inflammatory processes (e.g., Rheumatic Heart Disease), and infectious processes (e.g., endocarditis). Additionally, damage to the ventricle from prior heart attacks (e.g., myocardial infarction secondary to coronary artery disease) or other heart diseases (e.g., cardiomyopathy) can distort the geometry of the heart causing valves in the heart to dysfunction. Many patients undergoing valve surgery, such as mitral valve surgery, suffer from a degenerative disease that causes a malfunction in a leaflet of the valve, which results in prolapse and regurgitation.

Valve regurgitation occurs when the leaflets of the valve do not close completely, thereby allowing blood to leak back into the prior chamber when the heart contracts. There are generally three mechanisms by which a valve becomes regurgitant or incompetent, including Carpentier's type I, type II and type III malfunctions. A Carpentier type I malfunction involves the dilation of the annulus such that the area of the valve orifice increases. The otherwise normally functioning leaflets do not have enough surface area to cover the enlarged orifice and fail to form a tight seal (e.g., do not coapt properly) causing regurgitation. Included in a type I mechanism malfunction are perforations of the valve leaflets, as in endocarditis. A Carpentier's type II malfunction involves prolapse of a segment of one or both leaflets above the plane of coaptation. This is the most commonly treated cause of mitral regurgitation, and is often caused by the stretching or rupturing of chordae tendineae normally connected to the leaflet. A Carpentier's type III malfunction involves restriction of the motion of one or more leaflets such that the leaflets are abnormally constrained below the level of the plane of the annulus. Leaflet restriction can be caused by rheumatic heart disease (IIIa) or dilation of the ventricle (IIIb).

Mitral valve disease is the most common valvular heart disorder, with nearly 4 million Americans estimated to have moderate to severe mitral valve regurgitation ("MR"), with similar numbers of individuals impacted outside of the United States. MR can result in a volume overload on the left ventricle which in turn progresses to ventricular dilation, decreased ejection performance, pulmonary hypertension, symptomatic congestive heart failure, atrial fibrillation, right ventricular dysfunction, and/or death. Successful surgical mitral valve repair can at least partially restore mitral valve competence, abolish the volume overload on the left ventricle, improves symptom status, and/or prevents adverse left ventricular remodeling. While generally safe and effective, conventional open-heart operations are invasive, result in significant disability, and require extended post-procedure recovery. Patients routinely spend five to seven days in the hospital and often are not able to return to normal daily activities for a month or more.

In many instances of mitral valve regurgitation, repair may be preferable to valve replacement. There are a variety of advantages to performing heart valve repair (e.g., mitral valve repair) using less invasive procedures while the heart is still beating, as described in detail herein. Mitral valve repair procedures may rely upon use of visualization technology, such as sonic guidance, which may have limitations that can reduce the effectiveness of such repairs. Accordingly, there is a continuing need for new procedures and devices for performing less invasive mitral valve repairs which do not require cardiac arrest and are less technologically challenging.

In some implementations, the present disclosure relates to an anchor guide for controlling placement of one or more suture knots or other tissue anchors. In some embodiments, the anchor guide comprises a relatively thin shaft having a central lumen, atraumatic tip, and proximal hemostasis valve(s). The anchor guide may include mechanical features for allowing the anchor guide to slide over an existing pair of suture portions (e.g., polytetrafluoroethylene (PTFE, or ePTFE)) to facilitate consistent/controlled spacing with the next adjacent anchor to be deployed on the valve leaflet, and lessens the dependence on echo imaging for proper targeting. The term "suture" is used herein according to its plain and ordinary meaning and may refer to any elongate cord strip, strand, line, tie, string, ribbon, strap, or portion thereof, or other type of material used in medical procedures. One having ordinary skill in the art will understand that a wire or other similar material may be used in place of a suture. Furthermore, in some contexts herein, the terms "cord" and "suture" may be used substantially interchangeably. In addition, use of the singular form of any of the suture-related terms listed above, including the terms "suture" and "cord," may be used to refer to a single suture/cord, or to a portion thereof. For example, where a suture knot or anchor is deployed on a distal side of a tissue portion, and where two suture portions extend from the knot/anchor on a proximal side of the tissue, either of the suture portions may be referred to as a "suture" or a "cord," regardless of whether both portions are part of a unitary suture or cord. Anchor guides in accordance with aspects of the present disclosure may be utilized in methods for controlling spacing of surgical sutures deployed in a ventricle and/or atrium of a heart. Such sutures and/or associated anchors may be introduced to the target implantation site using a minimally invasive incision and may be implanted/deployed while the patient's heart is beating.

FIG. 1 is a cutaway view of a heart 10. The heart 10 has four chambers, the left atrium 12, left ventricle 14, right atrium 16, or right ventricle 18. The left atrioventricular valve, the mitral valve 22, controls the passage of oxygenated blood from the left atrium 12 to the left ventricle 14. Access into a chamber 12, 14, 16, 18 in the heart 10 may be made at any suitable site of entry. Certain embodiments disclosed herein related to process for accessing a chamber of the heart using a trans-apical access at or near the apex region (AR) of the heart slightly above the apex 20 at the level of the papillary muscles 19. For example, access into the left ventricle 14 to perform a mitral valve repair may be gained through a process performed in the apical region, close to, or slightly skewed toward the left of, the median axis of the heart 10. Generally, an apex region (AR) of the heart is a bottom region of the heart that is within the left or right ventricular region and is below the mitral valve 22 and tricuspid valve 24 and toward the tip or apex 20 of the heart 10. More specifically, an apex region (AR) of the heart may be considered to be within a few centimeters to the right or to the left of the ventricular septum of the heart 10 at or near the level of the papillary muscles 19. Accordingly, the ventricle can be accessed directly via the apex 20, or via an off-apex location that is in the apical or apex region (AR), but slightly removed from the apex 20, such as via a lateral ventricular wall, a region between the apex 20 and the base of a papillary muscle 19, or even directly at the base of a papillary muscle 19 or above. The incision made to access the appropriate ventricle of the heart may be no longer than about, for example, about 0.5 cm. Alternatively, access can be obtained using the Seldinger technique.

Figure 2:
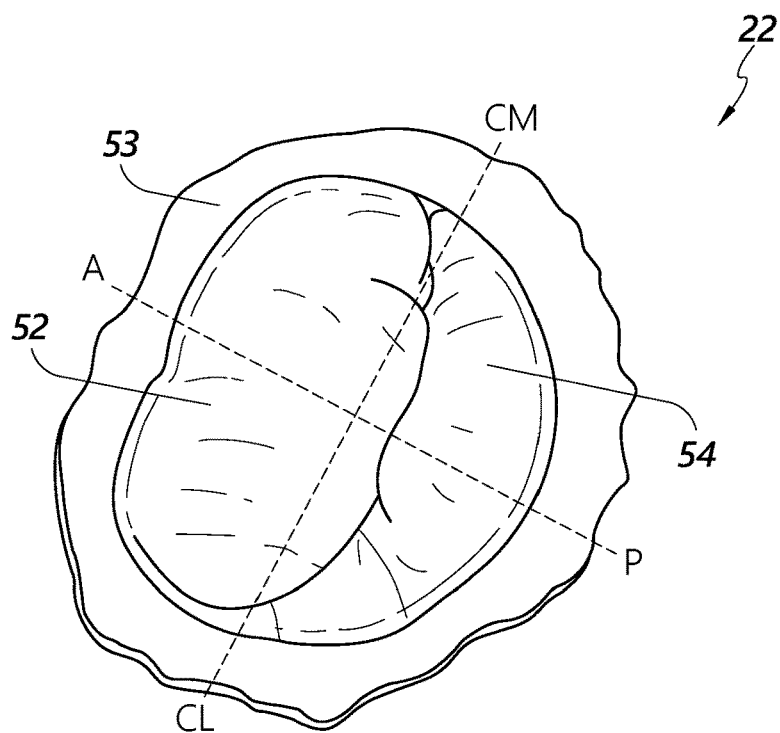
FIG. 2 is a top perspective view of a healthy mitral valve with the mitral leaflets closed.

FIG. 2 is a top perspective view of a mitral valve 22 with the mitral leaflets 52, 54 closed. The mitral valve 22 generally includes two leaflets, the anterior leaflet 52 and the posterior leaflet 54, and a diaphanous incomplete ring around the valve, called the annulus 53. Referring back to FIG. 1, the mitral valve 22 generally is attached to two papillary muscles 19, the anteromedial and the posterolateral papillary muscles, which attach the leaflets 52, 54 to the walls of the left ventricle 14 via the chordae tendineae 17. In FIG. 2, the leaflets 52, 54 achieve proper coaptation when closed, thereby substantially preventing regurgitation back into the atrium when the valve 22 is closed.

Figure 3:
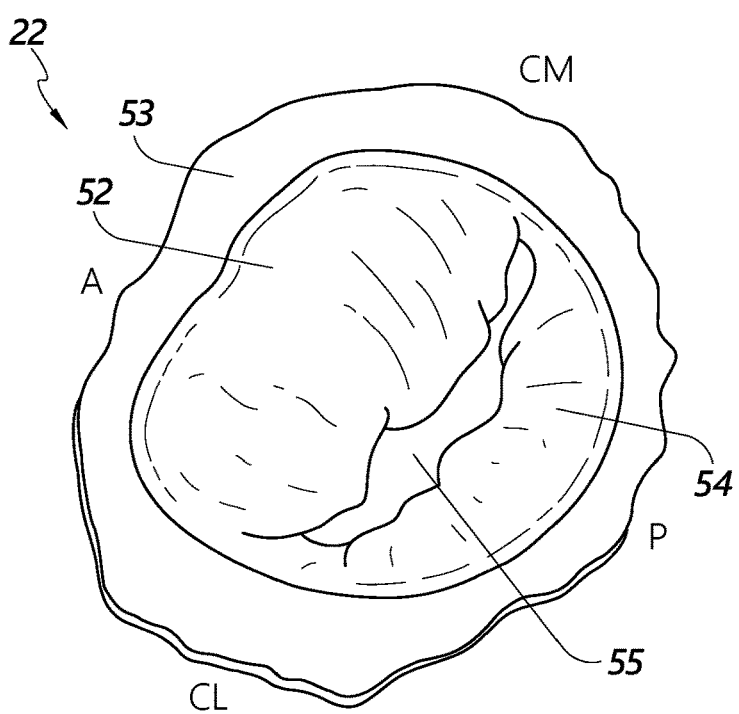
FIG. 3 is a top perspective view of a dysfunctional mitral valve with a visible gap between the mitral leaflets.

FIG. 3 is a top perspective view of a mitral valve 22 in a defective state, wherein a gap 55 between the mitral leaflets 52, 54 is present when the valve 22 is in a closed state. When the leaflets of a valve do not coapt properly, as in the image of FIG. 3, such defect may be the result of one or more of the leaflets being in a prolapsed state. Leaflet prolapse occurs when a prolapsed segment of a leaflet 52, 54 of a valve (e.g., the mitral valve 22) is displaced above the plane of the valve annulus into the associated atrium (e.g., the left atrium 12), preventing the leaflets from properly sealing together to form the natural plane or line of coaptation between the valve leaflets during the relevant cardiac phase (e.g., systole with respect to the mitral valve). With respect to the particular mitral valve 22 of FIG. 3, because one or more of the leaflets 52, 54 malfunctions, the mitral valve 22 does not close properly, and, therefore, the leaflets 52, 54 fail to coapt. This failure to coapt causes the gap 55 between the leaflets 52, 54 that allows blood to flow back into the left atrium, during systole, while it is being ejected by the left ventricle into the aorta. As set forth above, there are several different ways a leaflet may malfunction, which can thereby lead to regurgitation.

Mitral valve regurgitation generally increases the workload on the heart and may lead to various serious health conditions if left untreated, such as decreased ventricular function, pulmonary hypertension, congestive heart failure, permanent heart damage, cardiac arrest, and ultimately death. Since the left heart is primarily responsible for circulating the flow of blood throughout the body, malfunction of the mitral valve 22 is particularly problematic and can be life threatening.

Methods for repairing a target organ tissue, such as repair of mitral valve leaflets to address mitral valve regurgitation, include inserting a delivery device, such as a delivery device described in PCT Application No. PCT/US2012/043761, (published as WO 2013/003228, and referred to herein as "the '761 PCT Application") and/or in PCT Application No. PCT/US2016/055170 (published as WO 2017/059426 and referred to herein as "the '170 PCT Application"), the entire disclosure of each of which are incorporated herein by reference, into a body and extending a distal end of the delivery device to a proximal side of the tissue. Advancement of the delivery device may be performed in conjunction with sonography or direct visualization (e.g., direct transblood visualization), and/or any other suitable remote visualization technique. With respect to cardiac procedures, for example, the delivery device may be advanced in conjunction with transesophageal (FEE) guidance and/or intracardiac echocardiography (ICE) guidance to facilitate and to direct the movement and proper positioning of the device for contacting the appropriate target cardiac region and/or target cardiac tissue (e.g., a valve leaflet, a valve annulus, or any other suitable cardiac tissue). Typical procedures for use of echo guidance are set forth in Suematsu, Y., *J. Thorac. Cardiouasc. Surg.* 2005; 130:1348-56 ("Suematsu"), the entire disclosure of which is incorporated herein by reference.

The '761 PCT Application and the '170 PCT Application describe in detail methods and devices for performing non-invasive procedures to repair a cardiac valve, such as a mitral valve. Such procedures include procedures to repair regurgitation that occurs when the leaflets of the mitral valve do not coapt properly at peak contraction pressures, resulting in an undesired backflow of blood from the ventricle into the atrium. As described in the '761 PCT Application and the '170 PCT Application, after the malfunctioning cardiac valve has been assessed and the source of the malfunction verified, a corrective procedure can be performed. Various procedures can be performed in accordance with the methods described therein to effectuate a cardiac valve repair, which may depend on the specific abnormality and the tissues involved.

After prepping and placing the subject under anesthesia, a transesophageal echocardiogram (FEE) (two-dimensional, 2D, and/or three-dimensional, 3D), a transthoracic echocardiogram (TTE), intracardiac echo (ICE), and/or cardio-optic direct visualization (e.g., via infrared vision from the tip of a 7.5 F catheter) may be performed to assess the heart and its valves.

After a minimally invasive approach is determined to be advisable, one or more incisions are made proximate to the thoracic cavity to provide a surgical field of access. The total number and length of the incisions to be made depend on the number and types of the instruments to be used as well as the procedure(s) to be performed. The incision(s) should be made in such a manner to be minimally invasive. As referred to herein, the term minimally invasive means in a manner by which an interior organ or tissue may be accessed with as little as possible damage being done to the anatomical structure through which entry is sought. Typically, a minimally invasive procedure is one that involves accessing a body cavity by a small incision of, for example, about 5 centimeters (cm) or less made in the skin of the body. The incision may be vertical, horizontal, or slightly curved. If the incision is placed along one or more ribs, it should follow the outline of the rib. The opening should extend deep enough to allow access to the thoracic cavity between the ribs or under the sternum and is preferably set close to the rib cage and/or diaphragm, dependent on the entry point chosen.

In one example method, the heart may be accessed through one or more openings made by one or more small incisions in a portion of the body proximal to the thoracic cavity, such as between one or more of the ribs of the rib cage of a patient, proximate to the xyphoid appendage, or via the abdomen and diaphragm. Access to the thoracic cavity may be sought so as to allow the insertion and use of one or more thorascopic instruments, while access to the abdomen may be sought to allow the insertion and use of one or more laparoscopic instruments. Insertion of one or more visualizing instruments may then be followed by transdiaphragmatic access to the heart. Additionally, access to the heart may be gained by direct puncture (e.g., via an appropriately sized needle, for instance an 18-gauge needle) of the heart from the xyphoid region. Accordingly, the one or more incisions should be made in such a manner as to provide an appropriate surgical field and access site to the heart in the least invasive manner possible. Access may also be achieved using percutaneous methods further reducing the invasiveness of the procedure. See, e.g., "Full-Spectrum Cardiac Surgery Through a Minimal Incision Mini-Sternotomy (Lower Half) Technique," Doty et al., *Annals of Thoracic Surgery* 1998; 65(2): 573-7 and "Transxiphoid Approach Without Median Sternotomy for the Repair of Atrial Septal Defects," Barbero-Marcial et al., *Annals of Thoracic Surgery* 1998; 65(3): 771-4, the entire disclosures of each of which are incorporated herein by reference.

Once a suitable entry point has been established, the surgeon can use one or more sutures to make a series of stiches in one or more concentric circles in the myocardium at the desired location to create a "purse string" closure. The Seldinger technique can be used to access the left ventricle in the area surrounded by the purse string suture by puncturing the myocardium with a small sharp hollow needle (a "trocar") with a guidewire in the lumen of the trocar. In some contexts, trocar-type access devices are referred to as "introducers;" such devices may be used to provide a portal for placement or introduction of one or more instruments into a ventricle of the heart through a lumen thereof. In some embodiments, a trocar and a separate introducer device are employed to provide access to the heart ventricle.

Once the ventricle has been accessed, the guidewire can be advanced, and the trocar removed. A valved-introducer with a dilator device extending through the lumen of the valved-introducer can be advanced over the guidewire to gain access to the left ventricle. The guidewire and dilator can be removed and the valved-introducer can serve to maintain hemostasis, with or without a suitable delivery device inserted therein, throughout the procedure. Alternatively, the surgeon can make a small incision in the myocardium and insert the valved-introducer into the heart via the incision. Once the valved-introducer is properly placed the purse string suture is tightened to reduce bleeding around the shaft of the valved-introducer.

A suitable device, such as a delivery device described in the '761 PCT Application and/or the '170 PCT Application, may be advanced into the body and through the valved-introducer in a manner so as to access the left ventricle. The advancement of the device may be performed in conjunction with sonography or direct visualization (e.g., direct transblood visualization). For example, the delivery device may be advanced in conjunction with TEE guidance and/or ICE to facilitate and direct the movement and proper positioning of the device for contacting the appropriate apical region of the heart. Some procedures for use of echo guidance are set forth in Suematsu.

Certain delivery devices described in the in the '761 PCT Application and/or the '170 PCT Application can be used to deliver a plurality of sutures and/or associated anchors (e.g., suture knots) onto a mitral valve leaflet using minimally invasive techniques. A suture can be delivered into the left ventricle and a suture knot can be formed or configured on a distal/atrial side of the mitral valve leaflet using the suture, thereby coupling the suture to the mitral valve leaflet. One or more proximal portions of the suture can be secured to the outer ventricular wall of the heart. The length/tension of the suture or pair of sutures (e.g., suture portions) within the ventricle can be adjusted prior to securing the proximal portion to the outer ventricular wall of the heart.

Reliable spacing between adjacent suture knots/anchors deployed onto a heart valve leaflet, such as a mitral valve leaflet, can promote desired repair of heart valve regurgitation. For example, in repair procedures to address mitral valve regurgitation, sonic guidance, such as transesophageal echocardiogram (FEE) (2D and/or 3D), transthoracic echocardiogram (FTE), and/or intracardiac echo (ICE), can be used to guide positioning of tissue anchors (e.g., suture knots) onto the valve leaflets. However, deployment of a plurality of anchors onto a mitral valve leaflet at desired spacing(s)/position(s) performed under sonic guidance can be difficult due, for example, to the level of resolution of the sonic guidance technology, and/or equipment and/or software limitations. Furthermore, use of sonic guidance can be relatively cumbersome. For example, reliance upon continuous tracking of images in multiple planes can be typical in 2D visualization. Clear and constant communication between a surgeon and echocardiographer can often be needed for desired positioning of the anchors. Such challenges can render positioning of the second, third, and/or final anchor even more difficult, for example due in part to the number of elements tracked by the sonic guidance. As certain mitral valve leaflet repair procedures using tissue anchors, as described herein, can be performed on a beating heart, motion of the beating heart, such as the mitral valve leaflets, may also interfere with desired visualization using sonic guidance.

One or more devices and/or methods described herein can provide controlled spacing/positioning of adjacent suture knots or other anchors while reducing or eliminating reliance upon sonic guidance to position the suture knots onto a mitral valve leaflet. Although certain embodiments are described herein in the context of suture knots, it should be understood that references to suture knots herein are applicable to other types of suture anchors comprising any suitable or desirable material and/or configuration. Therefore, references herein to suture knots may be interpreted as references to any other type(s) of anchors. Furthermore, although certain embodiments are described herein in the context of mitral valves, mitral valve leaflets, and/or mitral valve repair, it should be understood that the principles disclosed herein are applicable to any type of valve, valve repair, tissue, or other types of suture anchoring, such as for purposes other than valve repair. Furthermore, principles and embodiments disclosed herein may be applicable to certain non-biological applications as well.

In some embodiments, an anchor guide can be used in combination with an anchor delivery device to provide reliable spacing of adjacent suture knots/anchors. The anchor guide can have an elongate member or shaft that defines a space configured to receive and/or at least partially contain, house, or capture one or more suture portions associated with a suture anchor previously deployed onto a first location on a mitral valve leaflet (or other valve leaflet, such as for a tricuspid valve, or other biological tissue). In some embodiments, a suture associated with the suture portion(s) can be used to form a first suture knot at the first location, the suture knot representing the suture anchor referenced above. The elongate shaft of the anchor guide can be inserted into the left ventricle (or right ventricle) through an access opening on the heart wall.

With the previously deployed suture portion(s) captured or received within the space defined by the elongate shaft of the anchor guide, the elongate shaft of the anchor guide can be extended so as to contact the first anchor location of the mitral valve leaflet. Subsequently, an elongate lumen member of an anchor delivery device or introducer can be inserted through the access opening. An elongate lumen member of an anchor delivery device, which may or may not be the same anchor delivery device used to place the first or previous suture anchor, can be configured to be extended to contact a second portion or location of the proximal side of the target mitral valve leaflet, the elongate lumen member of the anchor delivery device being configured to be positioned in at least partial physical contact with the elongate shaft of the anchor guide while being extended to contact the second portion or location of the proximal side of the target mitral valve leaflet. The elongate shaft of the anchor guide can comprise one or more engagement features configured to provide sliding engagement with the elongate lumen member of the anchor delivery device. The anchor delivery device used for placement of the second suture can be configured such that the second suture can be deployed to the second location on the valve leaflet using the anchor delivery device, wherein a distance between the first and second locations can depend at least in part on the width or dimension of the elongate shaft, or spacer feature thereof, of the anchor guide. The anchor guide and the anchor delivery device can be used in a minimally invasive mitral valve repair procedure, with or without sonic guidance, to sequentially deploy suture knots/anchors at controlled distances from one another.

The methods, operations, steps, etc. described herein can be performed on a living animal or on a non-living cadaver, cadaver heart, simulator (e.g. with the body parts, tissue, etc. being simulated), etc.

Valve Repair Using Controlled Leaflet Anchor Spacing

Figure 4:
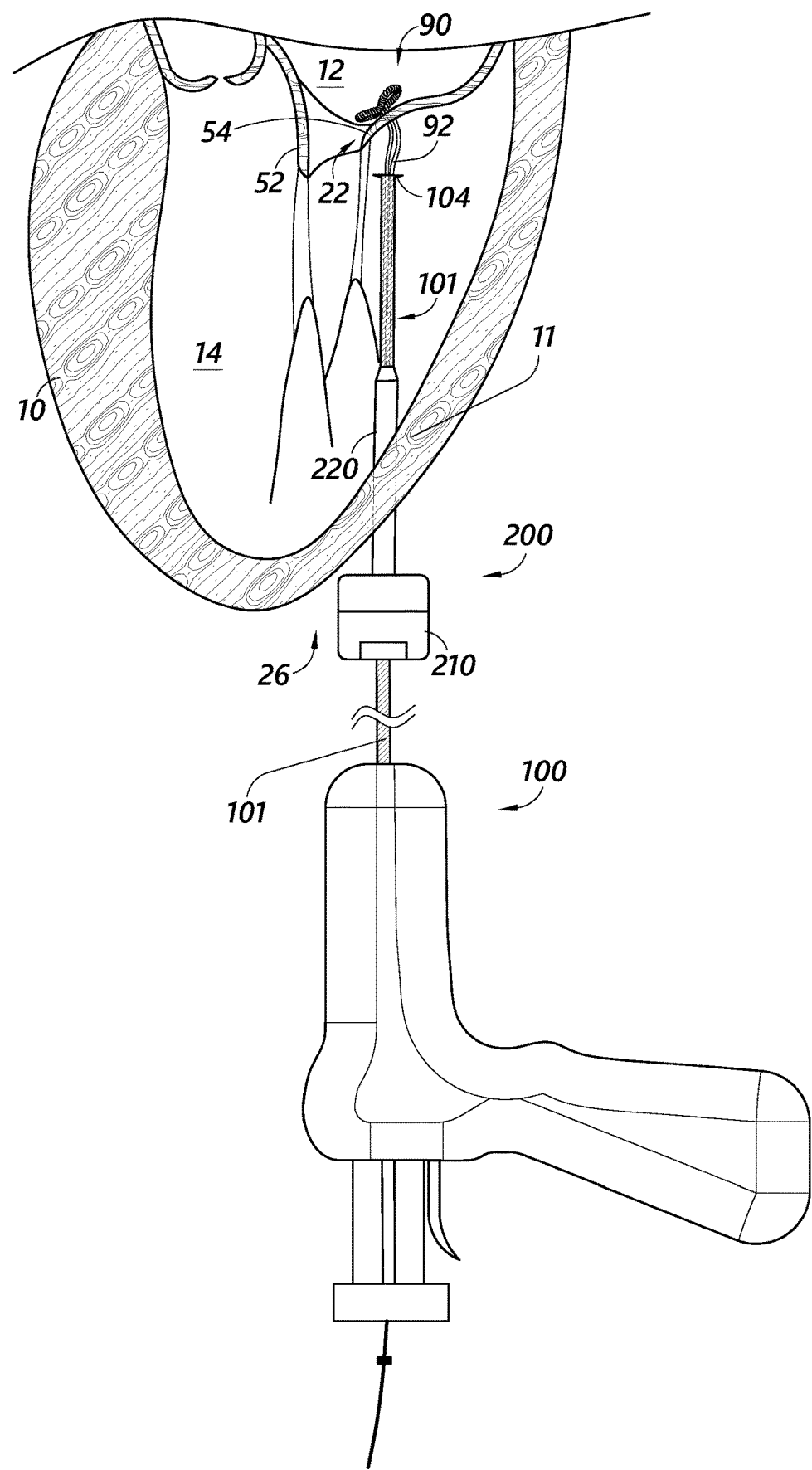
FIG. 4 shows an example of an anchor delivery device inserted into a left ventricle of a heart for repairing a mitral valve in accordance with one or more embodiments.

FIG. 4 shows an anchor delivery device 100 inserted into a ventricle 14 (e.g., left ventricle) of a heart 10 in connection with a valve repair procedure in accordance with one or more embodiments of the present disclosure. For example, the valve 22 may be a mitral valve. The anchor delivery device 100 can be configured to deliver a tissue anchor 90 (e.g., suture knot) to the valve leaflet 52. As an example, FIG. 4 shows a valve leaflet 52, which may represent a posterolateral leaflet of a mitral valve. It will be understood that the anchor delivery device 100 can also deliver the suture anchor 90 to the anteromedial mitral valve leaflet. Although the description of FIG. 4 below is presented in the context of a mitral valve, it should be understood that the principles disclosed herein are applicable to other valves or biological tissues, such as a tricuspid valve.

The anchor delivery device 100 can comprise an elongate lumen member 101 configured to allow delivery of the anchor 90 to the valve leaflet 52. The lumen member 101 can comprise a functional distal end portion 104 configured to perform one or more selected functions, such as grasping, suctioning, irrigating, cutting, suturing, or otherwise engaging a valve leaflet. The functional distal portion 104 can be configured to contact the mitral valve leaflet 52 to effect repair of the mitral valve 22.

The anchor delivery device 100 can be inserted into a heart chamber, such as the left ventricle 14, through an introducer device 200, which includes a body portion 210 and a lumen member portion 220. The lumen member portion 220 of the introducer device 200 may be passed through the ventricular wall 11 via an incision/access at or proximate to the apex 20 of the heart 10. The lumen member 101 of the delivery device 100 can be passed through the lumen member portion 220 of the introducer device 200 and out of a distal tip thereof into the ventricle 14 to contact the valve leaflet 52 for delivery of the suture anchor 90 to a target site on the valve leaflet 52. Sonic guidance, such as transesophageal echocardiogram (FEE) (2D and/or 3D), transthoracic echocardiogram (FTE), and/or intracardiac echo (ICE), may be used to assist in the advancement and desired positioning of the anchor delivery device 100 within the ventricle 14. The distal end 104 of the delivery device 100 can contact a proximal surface (e.g., underside surface with respect to the illustrated orientation of FIG. 4) of the mitral valve leaflet 52, without or substantially without damaging the leaflet 52. For example, the distal end 104 in contact with the leaflet 52 can have a blunt form or configuration. The distal end 104 can be configured to maintain contact with the proximal side of the valve leaflet 52, for example, to facilitate reliable delivery of the anchor 90 to the target site on the leaflet 52.

In some embodiments, one or more perforation devices (e.g., needle(s)) can be delivered through the lumen member 101 of the delivery device 100 to the valve leaflet 52 to puncture the valve leaflet 52 and project a sutureform into the atrium, wherein the sutureform is deployed to form the anchor 90. For example, in some embodiments, a slotted needle (not shown) is deployed from the distal end 104 of the delivery device 100, thereby puncturing the leaflet 52 and projecting into the atrium 12, wherein the slotted needle is wrapped with a suture (e.g., PTFE suture) in a particular configuration (See the '761 PCT Application for further detail regarding example suture wrapping configurations and needles for use in suture anchor deployment devices and methods). In some embodiments, a pusher or hollow guide wire (not shown) is provided on or at least partially around the needle, such that the needle may be withdrawn, leaving the pusher and wound sutureform. When a withdrawal force is applied to the sutureform using the pusher, the sutureform may form a bulky-knot-type anchor (e.g., the anchor 90), after which the pusher may be withdrawn, leaving the permanent knot to anchor the suture 92 to the leaflet 52.

As described herein, the anchor delivery device 100 can be used in beating heart mitral valve repair procedures. In some embodiments, the elongate lumen member 101 of the delivery device 100 can be configured to extend and contract or retract with the beat of the heart 10. During systolic contraction, the median axis of the heart 10 generally shortens. For example, the distance from the apex 20 of the heart to the valve leaflets 52, 54 can vary by about 1 centimeter (cm) to about 2 centimeters (cm) with each heartbeat in some patients. In some embodiments, the length of the elongate lumen member 101 can change with the length of the median axis of the heart 10. The distal end 104 of the elongate lumen member 101 can be configured to be floating such that the distal end 104 can extend and retract with the beat of the heart 10 so as to maintain contact with the mitral valve leaflet 52.

Figure 5:
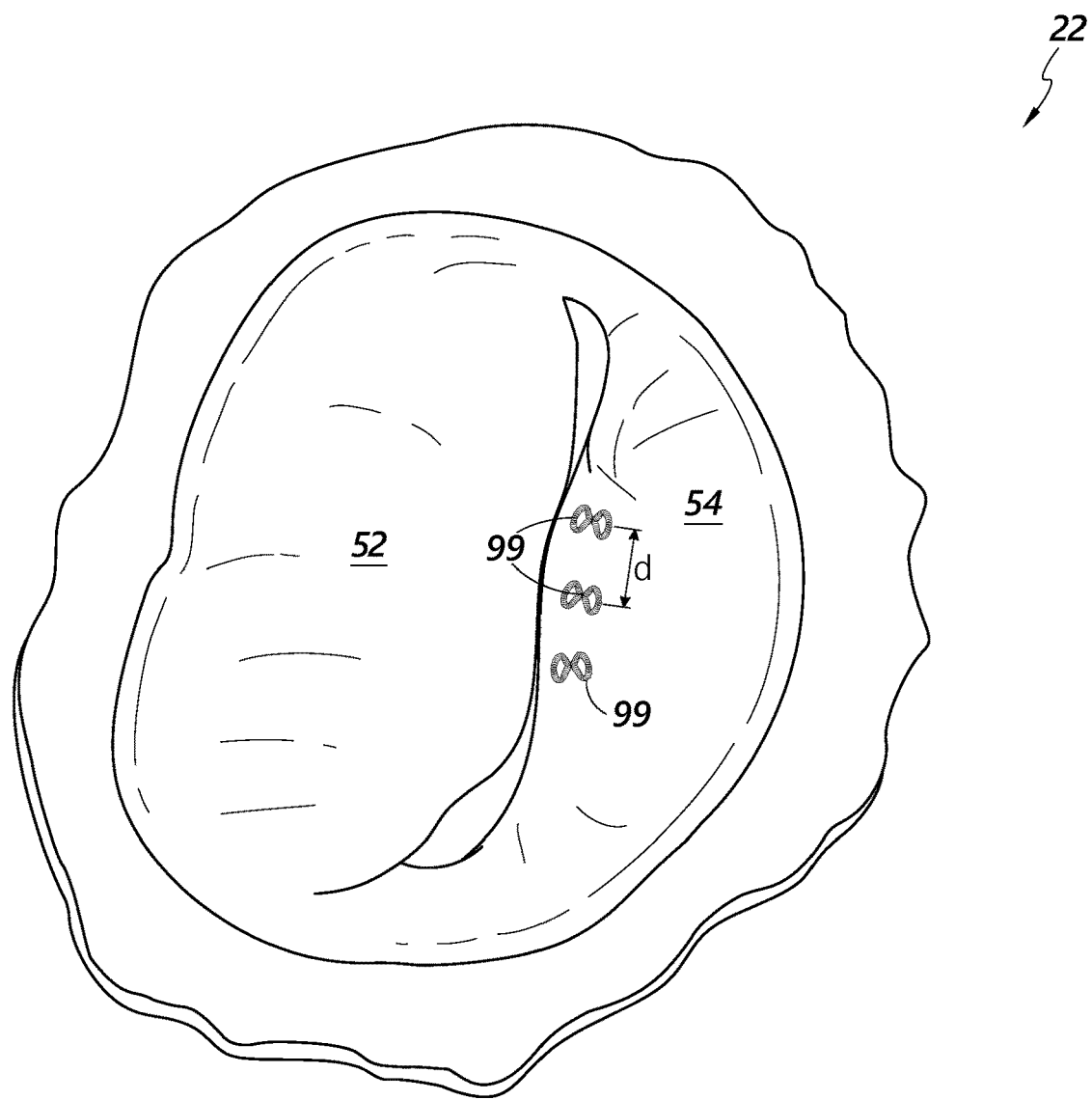
FIG. 5 is a top perspective view of a mitral valve comprising a plurality of suture knots deployed thereon in accordance with one or more embodiments.

FIG. 5 shows a top view of a mitral valve leaflet 54 having a plurality of suture anchors (e.g., knots) 99 formed thereon. An anchor delivery device as described herein can be used to deliver the plurality of suture knots 99 onto the atrial/distal side of the mitral valve leaflet 54. The anchor delivery device can be used to sequentially deploy the suture knots 99 onto the mitral valve leaflet 54. Although FIG. 5 shows three suture knots 99 deployed onto the mitral valve leaflet 54, it should be understood that more or fewer suture knots can be formed/deployed on the mitral valve leaflet 54 to provide desired mitral valve repair. A distance "d" between adjacent suture knots can be selected to provide desired mitral valve repair functionality. In some embodiments, the distance d between adjacent suture knots can be about 1 millimeter (mm) to about 10 millimeters (mm), about 2 millimeters (mm) to about 8 millimeters (mm), about 3 millimeters (mm) to about 7 millimeters (mm), or about 4 millimeters (mm) to about 6 millimeters (mm), for example about 5 millimeters (mm). One or more anchor guides described herein can be used in combination with an anchor delivery device to facilitate reliable spacing between adjacent suture knots 99.

As referenced above, proper/desirable positioning and spacing of knots or other leaflet anchors can be difficult to achieve for various reasons. For example, delivery devices for deploying leaflet anchors, as described herein, can be relatively difficult to precisely control. Furthermore, where echocardiographic imaging is utilized to assist with positioning/spacing, inaccurate configuration of the echocardiograph tool(s) such that the desired image plane(s) are not presented can impede the surgeon's ability to achieve the proper/desired placement and/or spacing. In addition, the anchor delivery system may move or shift after the surgeon has positioned the anchor deliver system in the desired position.

Figure 6:
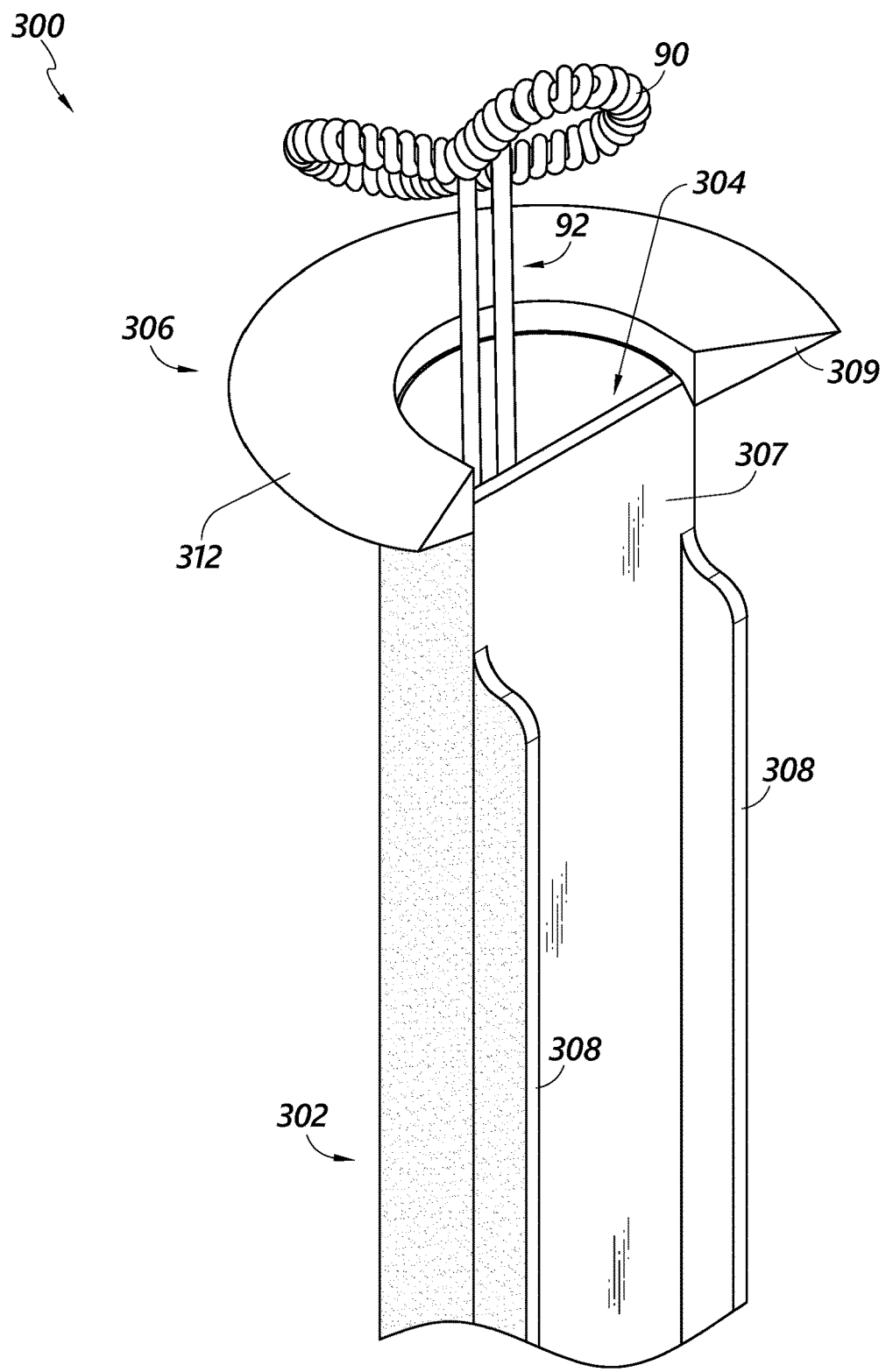
FIG. 6 is a perspective view of an example of an anchor guide in accordance with one or more embodiments.

FIG. 6 is a perspective view of the distal portion of an example anchor guide/spacer 300 in accordance with one or more embodiments of the present disclosure. The anchor guide 300 can comprise an elongate shaft 302 having a space or channel 304 configured to receive one or more suture portions connected to, or otherwise associated with, an anchor (e.g., suture knot) 90 previously deployed on a valve leaflet (e.g., mitral valve leaflet; not shown for illustration purposes). For example, the anchor 90 can be formed on the mitral valve leaflet using a suture comprising the one or more suture portions 92, such that the anchor 90 and the suture portion(s) are part of a unitary length of suture. The shaft 302 can comprise a distal atraumatic tip portion 306 configured to contact the valve leaflet. The shaft 302 can be inserted through the access incision/opening made in the heart wall and extended from the access opening into the left (or right) ventricle until the distal tip portion 306 contacts the valve leaflet, while positioned over at least a portion of the suture(s) 92. For example, the suture(s) 92 can be received or disposed in the channel 304 defined by shaft 302 as the shaft 302 is extended to the mitral valve leaflet. The channel 304 can be defined at least in part by the elongate shaft 302 to retain the suture 92. The distal tip portion 306 can be configured to maintain contact with the valve leaflet after the shaft 302 is extended to the desired position so as to facilitate stable positioning of the anchor guide 300 against the mitral valve leaflet. The anchor guide 300 comprises one or more spacing features configured to provide a spacing distance between the channel 304 and a device disposed in physical contact with the spacing feature(s), such as a delivery system distal tip or lumen member. For example, the one or more spacing features may comprise the illustrated flanges 308 and/or tip surfaces 309.

The anchor guide 300 can be sized/dimensioned so as to facilitate providing desired spacing between adjacent suture knot(s). For example, the shaft 302 can be sized/dimensioned to facilitate providing the desired spacing between adjacent suture knots when a lumen member of an anchor delivery device is brought into appropriate physical contact with at least a portion of the anchor guide 300. For example, the shaft 302 can have radius and/or diameter dimension selected to provide the desired spacing 'x' between a central shaft axis 303 and a central anchor axis 305 (see FIG. 7) associated with an anchor delivery lumen member 702 physically coupled or contacting a side portion 307 of the shaft 302 and/or tip portion 306. In some embodiments, the shaft 302 can be sized such that adjacent sutures can be placed about 5 millimeters (mm) apart (see dimension x in FIG. 7) on a mitral valve leaflet.

In some embodiments, the shaft 302 and/or tip 306 can have an arcuate shape, wherein a delivery lumen member can fit with and/or be secured by concave or inclined surface, face, or feature (e.g., surface 309, guide feature(s) 308). In some embodiments, a longitudinal cross-section of the shaft 302 can have a semi-circle, crescent, or like shape. For example, the radius or other dimension of the semi-circle can be selected so as to provide desired spacing between the location on the valve leaflet at which the anchor 90 associated with the suture(s) 92 received within the space 304 of the shaft 302 is deployed and a location on the valve leaflet at which a subsequent suture is deployed. It will be understood that other longitudinal cross-sectional shapes can also be used, including, for example, a partial or full oval or circle shape.

The shaft 302 may include a side portion 307, such as a wall, bar, strap, or other barrier, that serves to retain and/or restrain the suture(s) 92 within the space 304. By restraining the suture(s) 92 within the space 304, the spacing of the anchor guide 300 can advantageously control the spacing between the restrained suture(s) 92, and therefore the associated anchor 90, and guide feature(s) (e.g., 308, 309) of the anchor guide 300. In some embodiments, the space 304 can comprise at least a portion of which that is enclosed by the barrier feature 307. For example, the shaft 302 can comprise an enclosed lumen extending along at least a portion of its length to receive or hold at least a portion of the suture(s) 92. In some embodiments, an enclosed lumen can extend along substantially an entire length of the shaft 302. In some embodiments, an enclosed lumen can extend along only a portion of the length of the shaft 302.

In some embodiments, the shaft 302 can have an opening extending along at least a portion of its length such that the space 304 is not fully enclosed. The space 304 defined by shaft 302 can have a semi-circle/semi-cylinder shape. In some embodiments, the space 304 can comprise another shape, such as another arcuate shape, including a partial oval shape. In some embodiments, the space 304 can extend along an entire or substantially an entire length of the shaft 302. In some embodiments, the space can extend along only a portion of the length of the shaft 302.

As referenced above, the shaft 302 can comprise a pair of guide/engagement features 308 extending along at least a portion of its length configured to engage with an anchor delivery device (e.g., an embodiment of the delivery device 100 as described with reference to FIG. 4). The anchor guide 300 can be used in combination with the anchor delivery device to facilitate reliable/controlled spacing between adjacent anchors (e.g., suture knots). As described herein, the shaft 302 can be slid over a previously deployed suture 92. The anchor delivery device can be deployed to subsequently deliver one or more additional anchors to the target valve leaflet. For such purpose, the anchor delivery device can be deployed adjacent to and in physical contact with the anchor guide 300. For example, the engagement feature(s) 308 can have a sliding engagement with the anchor delivery device, such as with an elongate lumen member and/or distal tip of the anchor delivery device. The engagement features 308 can allow secure positioning of the anchor guide 300 against the anchor delivery device such that reliable spacing can be provided between the subsequently deployed anchor(s).

As shown in FIG. 6, the engagement feature(s) 308 can comprise a pair of opposing extensions, such as a pair of opposing flanges, extending along at least a portion of a length of the shaft 302. The engagement feature(s) 308 can extend from opposing edges of the shaft 302. In some embodiments, a corresponding portion of an anchor delivery device elongate lumen member can be received at least partially between or against opposing flange features of the anchor guide 300. The delivery device, such as a lumen member thereof, may be in contact with the opposing flanges as the lumen member is slid relative to the shaft 302 during positioning of the distal end of the lumen member of the delivery device.

The engagement feature(s) 308 can have a variety of features configured to allow a reliable sliding engagement between the anchor guide 300 and an anchor delivery device. The engagement feature(s) 308 can provide reliable positioning of the anchor guide 300 relative to the anchor delivery device while the anchor delivery device is moved relative to the anchor guide 300. In some embodiments, the engagement feature(s) 308 can extend along an entire or substantially an entire length of the shaft 302. In some embodiments, the engagement feature(s) 308 extends along only one or more portions of the shaft 302. For example, the engagement feature(s) 308 can extend along at least a portion of a length of the shaft 302 that is below the distal tip portion 306. In some embodiments, the engagement feature(s) 308 can be positioned at regular or irregular intervals along a portion of a length of the shaft 302.

Figure 7:
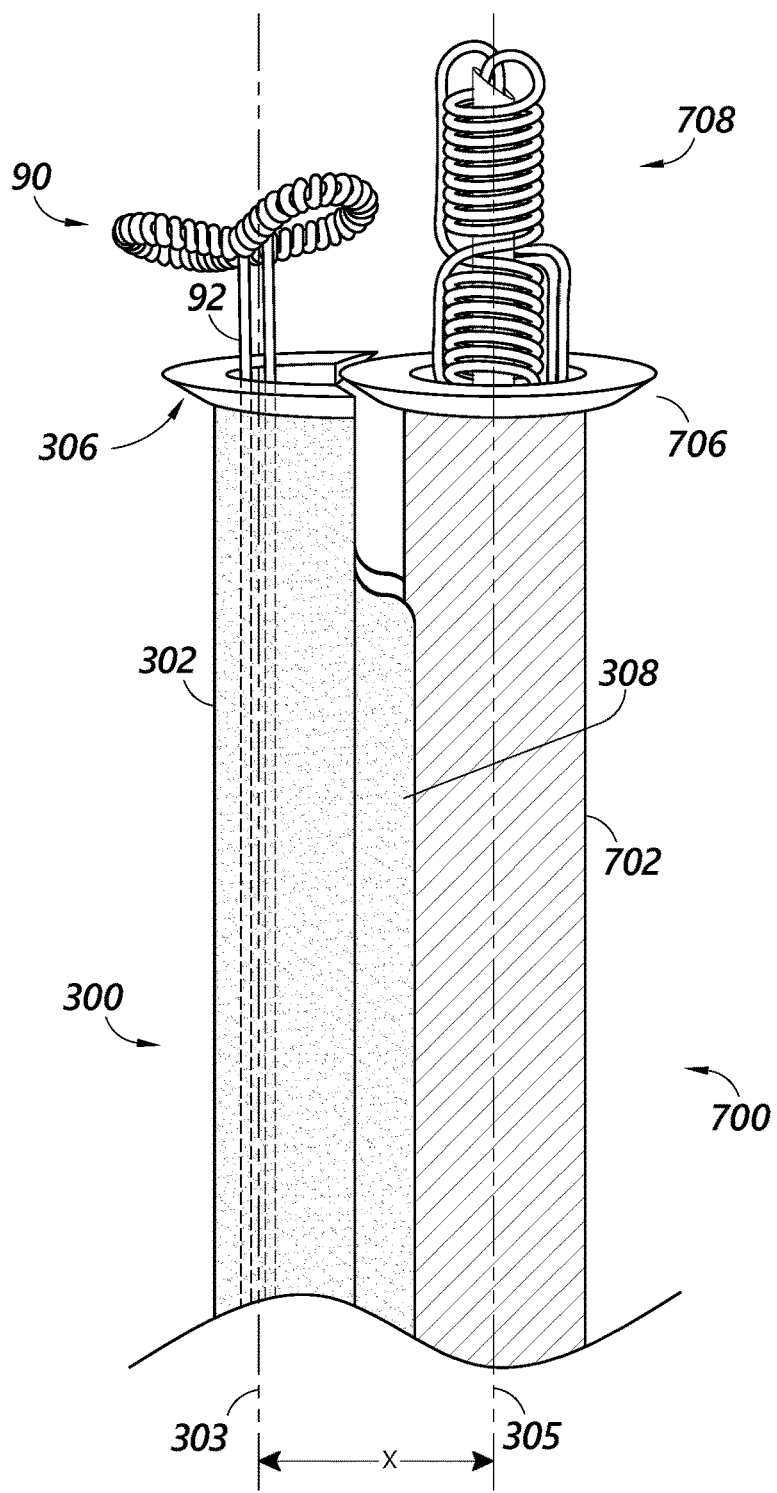
FIG. 7 shows an example of an anchor guide positioned adjacent to an anchor delivery device in accordance with one or more embodiments.

As described herein, the distal tip portion 306 can be configured to contact the mitral valve leaflet to facilitate reliable positioning of the anchor guide 300 and anchor delivery device (not shown; see FIG. 7). The distal tip portion 306 can contact the underside of the mitral valve leaflet, substantially without damaging the leaflet. For example, the distal tip portion 306 in contact with the leaflet can have a blunt configuration. The distal tip portion 306 can be configured to maintain reliable contact with the underside of the mitral valve leaflet to facilitate stable positioning of the anchor guide 300 such that reliable spacing can be achieved between consecutively deployed sutures. In some embodiments, the distal tip portion 306 can comprise a flexible flat surface 312 which can be positioned against the underside of the valve leaflet.

The anchor guide 300 can be used in beating-heart valve repair (e.g., mitral valve repair) procedures. The shaft 302 can be configured to extend and contract with the beat of the heart. For example, the position of the shaft 302 with respect to a longitudinal axis thereof can change with the length of the median axis of the heart. In some embodiments, the distal tip portion 306 of the shaft 302 can be configured to be floating such that the distal tip portion 306 can extend and retract with the beat of the heart. The distal tip portion 306 can extend and retract during systole and diastole phases so as to maintain contact with the mitral valve leaflet (e.g., extend outwardly about 1 centimeter (cm) to about 3 cm during the systolic phase). In some embodiments, the distal tip portion 306 can extend and retract so as to maintain a constant or substantially constant force/contact on the valve leaflet during the systolic and diastolic phases. The distal tip portion 306 can be configured to maintain contact with the mitral valve leaflet during movement of an anchor delivery device into position and/or during deployment of a subsequent suture using the anchor delivery device.

In some embodiments, the anchor guide 300 can comprise or be associated with a hemostasis valve (not shown) to prevent or reduce backflow of blood or other fluid during surgery. For example, the shaft 302 can comprise a proximal portion (not shown) including the homeostasis valve. The proximal portion may be a hub form, or the like.

The anchor guide in accordance with one or more embodiments of the present disclosure can be used with or without sonic guidance. In some embodiments, one or more portions of the anchor guide 300 can comprise echogenic material (e.g., hyperechogenic material). For example, at least an outer surface of the shaft 302 may comprise stainless steel (e.g., bead-blasted), or other material. Sonic guidance, including transesophageal echocardiogram (FEE) (2D and/or 3D), transthoracic echocardiogram (FTE), and/or intracardiac echo (ICE), may be used to assist in the advancement and desired positioning of the anchor guide 300.

In some embodiments, the anchor guide 300 can comprise one or more external markings to facilitate desired orientation of the anchor guide 300 during its use. The external markings can be on any portion of the anchor guide 300 viewable by an operator while operating the anchor guide 300. For example, one or more labels and/or shape(s) of the anchor guide 300 can provide guidance to the operator as to the orientation of the anchor guide 300. In some embodiments, the external markings can facilitate use of the anchor guide 300 without sonic guidance. For example, knowledge of the orientation of the anchor guide 300 can aide the operator in engaging an anchor delivery device with the anchor guide 300 so as to provide desired positioning of the anchor delivery device.

The anchor guide 300 can comprise any number of suitable materials. In some embodiments, the anchor guide 300 can comprise a rigid material, a semi-rigid material, or combination thereof. In some embodiments, the anchor guide 300 can comprise a metallic material, such as stainless steel. In some embodiments, the anchor guide 300 can comprise a polymeric material, such as polyethylene.

FIG. 7 shows an example of an anchor guide 300 positioned adjacent to an anchor delivery device 700. As described herein, the anchor guide 300 can be used in combination with the anchor delivery device 700 to facilitate reliable spacing between adjacent leaflet anchors (e.g., suture knots). As described herein, the shaft 302 of the anchor guide 300 can be slid over a previously-deployed suture (e.g., pair of suture tails) 92 associated with a previously-deployed anchor (e.g., suture knot) 90. The anchor delivery device 700 can be deployed to deliver a subsequent anchor 708 to a valve leaflet. For example, the anchor 708 can be delivered via an elongate lumen member 702 of the anchor delivery device 700 to the valve leaflet. The anchor 708 may be formed on a distal/atrial side of the valve leaflet as a suture knot, as described herein. The elongate lumen member 702 can be deployed adjacent to and in contact with the shaft 302 of the anchor guide 300. For example, engagement feature(s) 308 of the anchor guide 300 can be configured to engage with the elongate lumen member 702 of the delivery device 700. The engagement feature(s) 308 can allow secure positioning of the anchor guide 300 against the anchor delivery device 700 such that reliable spacing can be provided between the consecutively deployed sutures.

The engagement feature(s) 308 can be positioned against the anchor delivery device 700, such as against at least a portion of a length of the elongate lumen member 702 of the anchor delivery device 700, to securely position the anchor guide 300 relative to the anchor delivery device 700. The anchor delivery device 700 can have a pair of corresponding features (not shown) to engage with the engagement feature(s) 308. For example, an elongate lumen member 702 of the delivery device 700 can comprise a pair of corresponding recesses configured to receive the engagement feature(s) 308. The shaft 302 of the anchor guide 300 and the elongate lumen member 702 of the anchor delivery device 700 can be engaged with one another as the elongate lumen member 702 is slid relative to the shaft 302 of the anchor guide 300 to extend the anchor delivery device 700 to the subsequent target location on the mitral valve leaflet. For example, the anchor delivery device 700 can comprise a corresponding pair of grooves to receive the engagement feature(s) 308 such that the engagement feature(s) 308 can slide within the grooves as the anchor delivery device 700 is extended relative to the anchor guide 300. As described herein, the engagement features 308 can comprise a pair of opposing flanges. In some embodiments, the anchor delivery device 700 may not have corresponding engagement features to engage with the engagement feature(s) 308. For example, secure positioning of the elongate lumen member 702 of the anchor delivery device 700 relative to the shaft 302 of the anchor guide 300 may be achieved by positioning the elongate lumen member 702 of the delivery device 700 between the engagement feature(s) 308. The distal tip 706 of the delivery device 700 may further fit or engage or fit with a recess, or cut-out, feature of the distal tip 306 of the anchor guide 300, which may further serve to position the delivery device 700 in the desired spacing. In some embodiments, one or more magnets may be used to draw the distal tip 706 of the delivery device 700 to the distal tip 306 of the anchor guide 300. For example, each of the distal tip 706 of the delivery device 700 and the distal tip portion 306 of the anchor guide 300 may have attached thereto or embedded therein one or more magnets.

In some embodiments, an anchor delivery device can be used in combination with an anchor guide of a selected width, radius, diameter, or other spacing feature or dimension to provide the desired distance between adjacent tissue anchors (e.g., suture knots). In some embodiments, an anchor guide of a predetermined width/dimension can be selected based on the distance desired between anchors. For example, a kit configured for heart valve repair can comprise a plurality of anchor guides, each anchor guide comprising a different width or other dimension. In some embodiments, a kit can comprise one or more anchor delivery devices and a plurality of anchor guides, each anchor guide comprising a different width or other spacing dimension.

Controlled Anchor Spacing Processes

As described in detail above, in some implementations, the present disclosure relates to anchor guide systems and devices comprising a relatively thin shaft having a central lumen, an atraumatic tip, and/or one or more proximal hemostasis valves. The anchor guide may be advantageously configured to slide or otherwise be advanced/positioned over an existing pair of sutures, such as suture tails/portions associated with a deployed anchor. The anchor guide may be configured and/or dimensioned to facilitate more consistent spacing between adjacent anchors (e.g., ePTFE knots) deployed on, for example, a mitral leaflet. Furthermore, processes associated with anchor guides in accordance with the present disclosure may allow for reduced dependence on echo imaging for proper anchor targeting.

FIGS. 8 through 13 illustrate stages and aspects of a process for deploying tissue anchors in a heart in accordance with one or more embodiments. The various images in FIG. 8 through 13 relate to deployment of adjacent tissue anchors at desired distances from one another on a heart valve leaflet, such as a mitral valve leaflet. The process illustrated in FIG. 8 through 13 may be performed using an anchor guide and an anchor delivery device, as described herein.

Figures 1, 8:
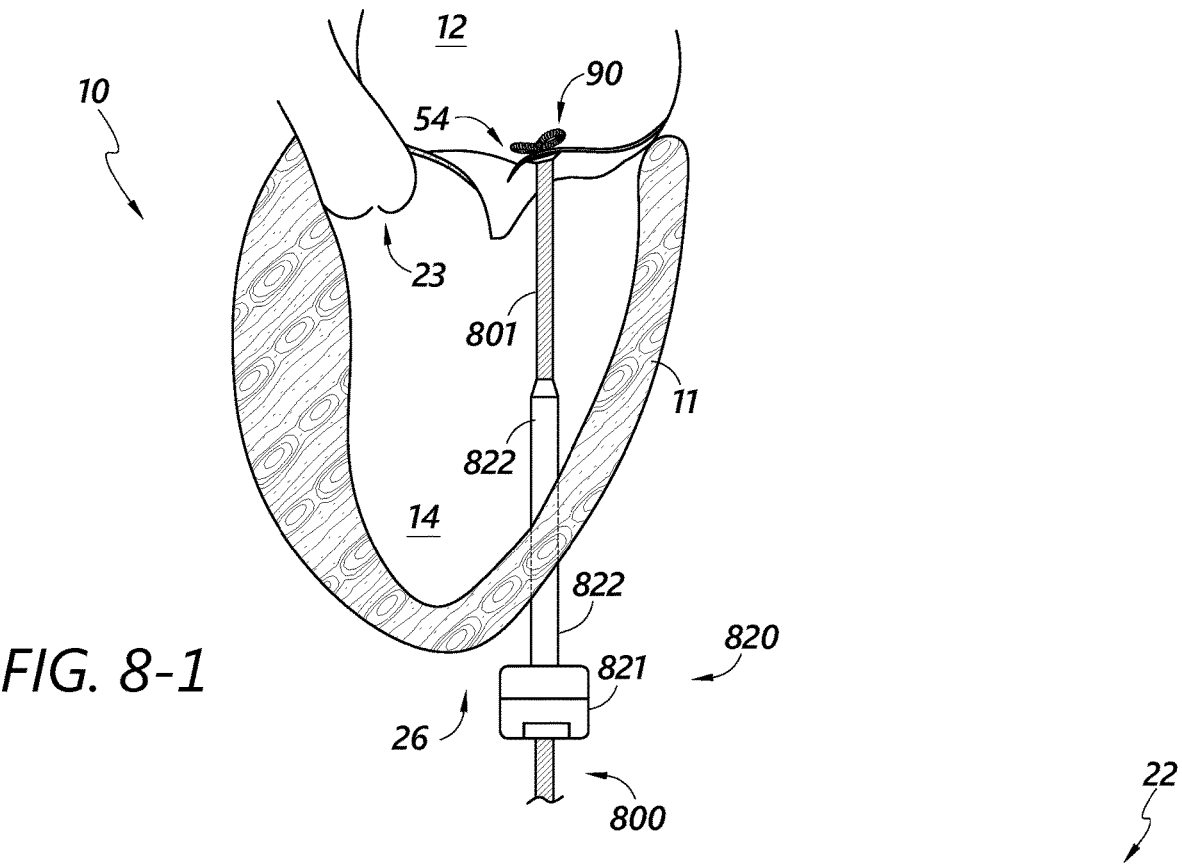
Figures 2, 8:
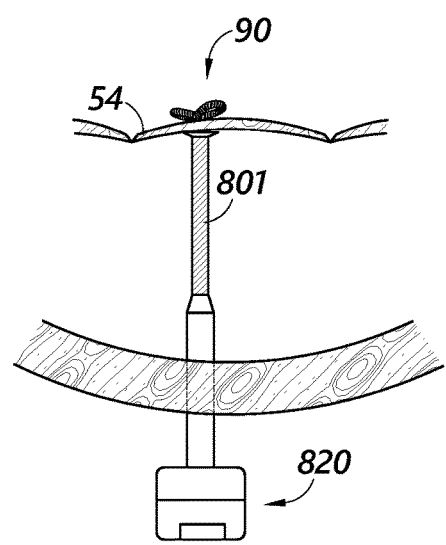
Figures 3, 8:
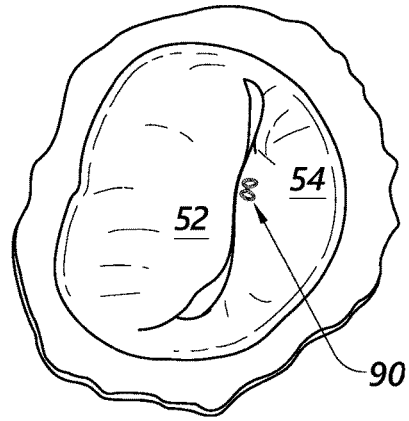

FIGS. 8-1 through 8-3, collectively referred to as FIG. 8, illustrate a suture placement system and associated cardiac anatomy at one or more stages of an anchor deployment process in accordance with one or more embodiments. FIG. 8-1 shows the deployment of a tissue anchor 90, such as a suture knot, on a valve leaflet 54, such as a mitral valve leaflet. FIG. 8-3 shows an atrial view of the deployed knot 90.

As described in detail above, certain systems, devices, and processes can be employed to reduce valve regurgitation caused by mid-segment prolapse, which may result from valve disease (e.g., mitral valve disease). For example, in certain valve repair procedures, a series of ePTFE cords are delivered and anchored on the P2 mitral valve leaflet in a beating heart under transesophageal echocardiography (FEE) guidance. FIGS. 8-1 through 8-3 show the delivery of a leaflet anchor 90 using an introducer 820 and a delivery system 800. The delivery system 800 may be used to deploy the anchor 90 via access to the target valve leaflet 54 through the introducer 820, which may be inserted into the ventricle 14 of the heart 10 at or near the apex 20 of the heart through, for example, a small left thoracotomy or other procedure. Generally, deployment of multiple anchors in a single leaflet may be desirable to establish effective coaptation between the valve leaflets (e.g., posterior and anterior mitral valve leaflets) and/or to better distribute the loads across the deployed anchors.

Echo imaging may be desirable or critical to successful placement/deployment of leaflet anchors with respect to valve repair procedures related to the present disclosure. However, use of echo/sonic imaging guidance can present certain challenges due to various factors. For example, echo images can be undesirably unclear due to errors or inadequacies of equipment and/or associated software. Furthermore, visualization using 2D echo technology may require continuous tracking of images in two planes, which can be difficult to effectively achieve in some instances. Additional complications with echo imaging include difficulties with performing the procedure on a beating heart in view of relatively constant leaflet and heart motion and maintaining clear and/or constant communication between the surgeon and the echocardiographer during the procedure. In addition, spacing and/or proper targeting of anchors can become relatively more difficult as additional anchors (e.g., knots) are deployed. For example, in some instances, the deployment of the final anchor of a procedure requires a greater amount of time due to targeting challenges.

The embodiments associated with FIGS. 8 through 13 provide solutions that advantageously lessen the dependence on echo imaging during the targeting of leaflet anchors and increase the consistency of anchor spacing after deployment of the first anchor of the procedure. FIG. 8-1 shows deployment of the anchor 90 in the leaflet 54. In deploying the anchor 90, it may be desirable or necessary to apply substantially constant pressure on the leaflet during positioning and/or puncturing of the leaflet. In positioning the anchor 90, the process may involve assessing positioning using echo imaging, as described herein.

The anchor 90 is delivered through a lumen in the delivery system 800, which is inserted in, and passes through, an access of a hub portion 821 and a lumen member 822 of the introducer 820. FIG. 8-2 shows a schematic view of the delivery system positioned against the valve leaflet 54 for deployment of the anchor 90. The view of the leaflet 54 in FIG. 8-2 may correspond to a cross-sectional medial-lateral view, wherein the leaflet 54 is a posterior leaflet of a mitral valve, as shown in the atrial view of FIG. 8-3.

Figures 1, 9:
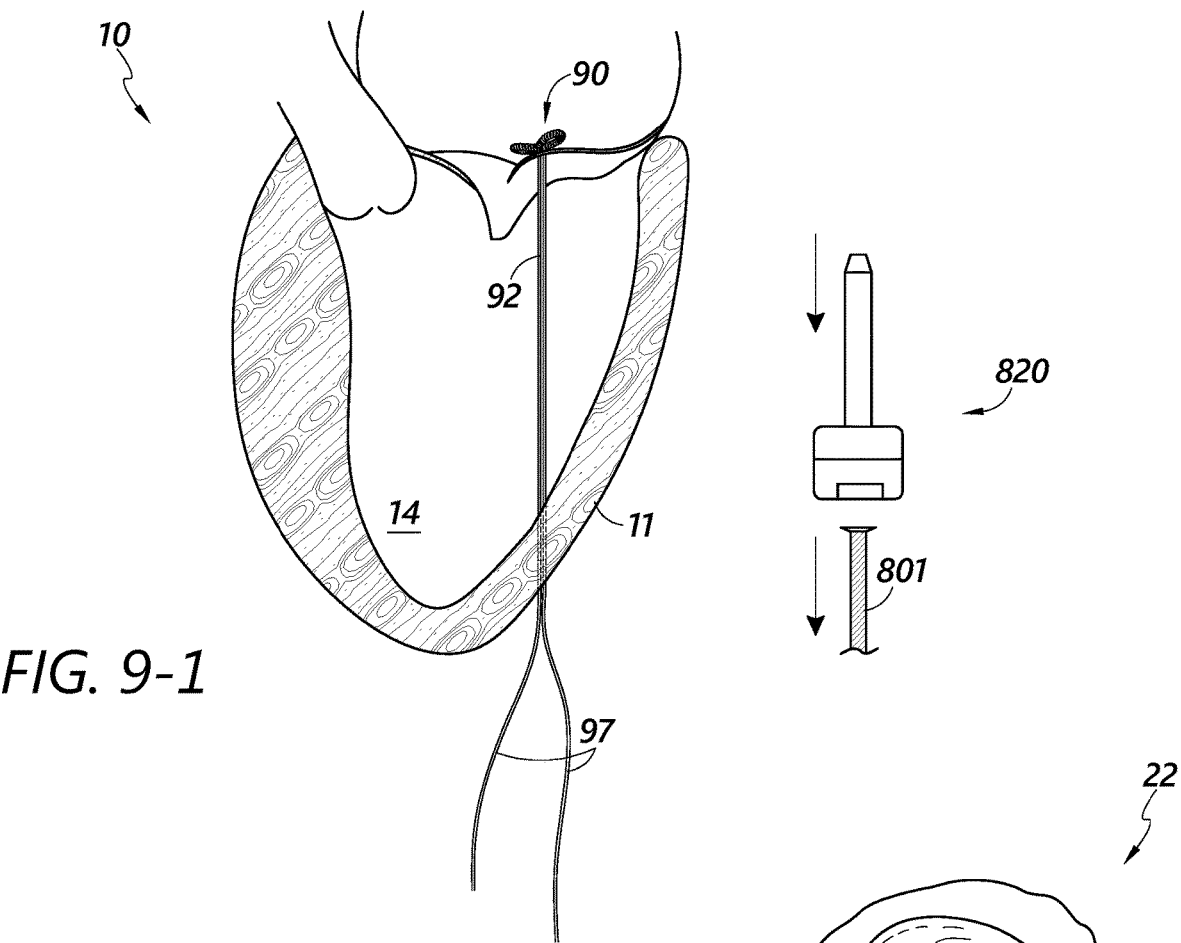
Figures 2, 9:
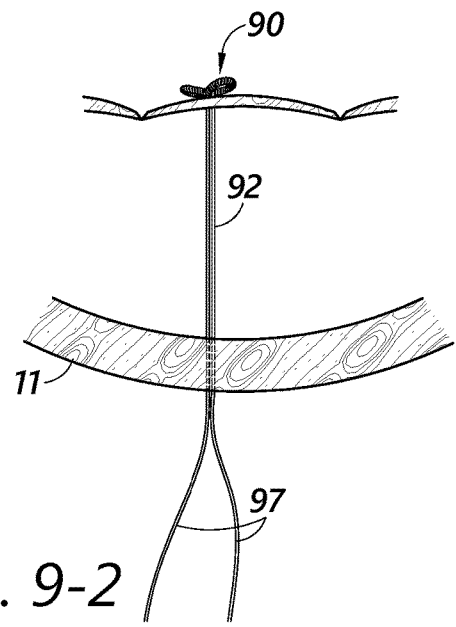
Figures 3, 9:
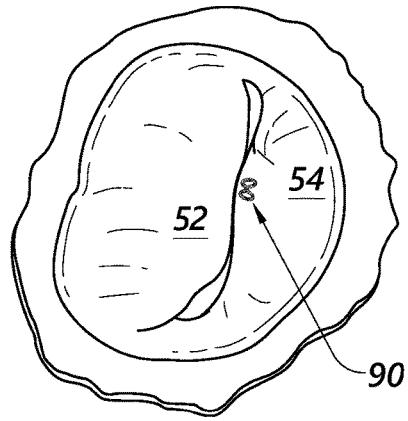

FIGS. 9-1 through 9-3, collectively referred to as FIG. 9, illustrate stages of the anchor deployment process after deployment of a first anchor in accordance with one or more embodiments. In the images of FIGS. 9-1 through 9-3, the introducer 820 has been removed from the heart 10, and the delivery system 800 has been withdrawn from the introducer 820. In some embodiments, the delivery system 800 is withdrawn from the introducer 820 prior to removal of the introducer 820. Although FIGS. 8 through 13 and the accompanying text show and describe the removal of the introducer 820 after deployment of the anchor 90, in some embodiments, the introducer is not removed prior to deployment of a second anchor (93, see FIGS. 15 and 16). The introducer 820 may be removed from the heart 10 and the suture tails 97 may be withdrawn from the introducer 820, as shown. The suture(s) 92, 97 may be pulled to reduce slack for tensioning and/or to allow for an anchor guide to be passed over the suture(s), as described in detail below.

FIG. 9-2 shows a schematic view of the deployed anchor 90 and associated suture portion(s) 92, which pass through the heart wall 11 (e.g., left ventricular wall) and are associated with the suture tail(s) 97 that are accessible external to the heart and/or chest cavity of the patient. FIG. 9-3 shows an atrial view of the valve 22, showing the anchor 90 deployed on the leaflet 54.

Figures 1, 10:
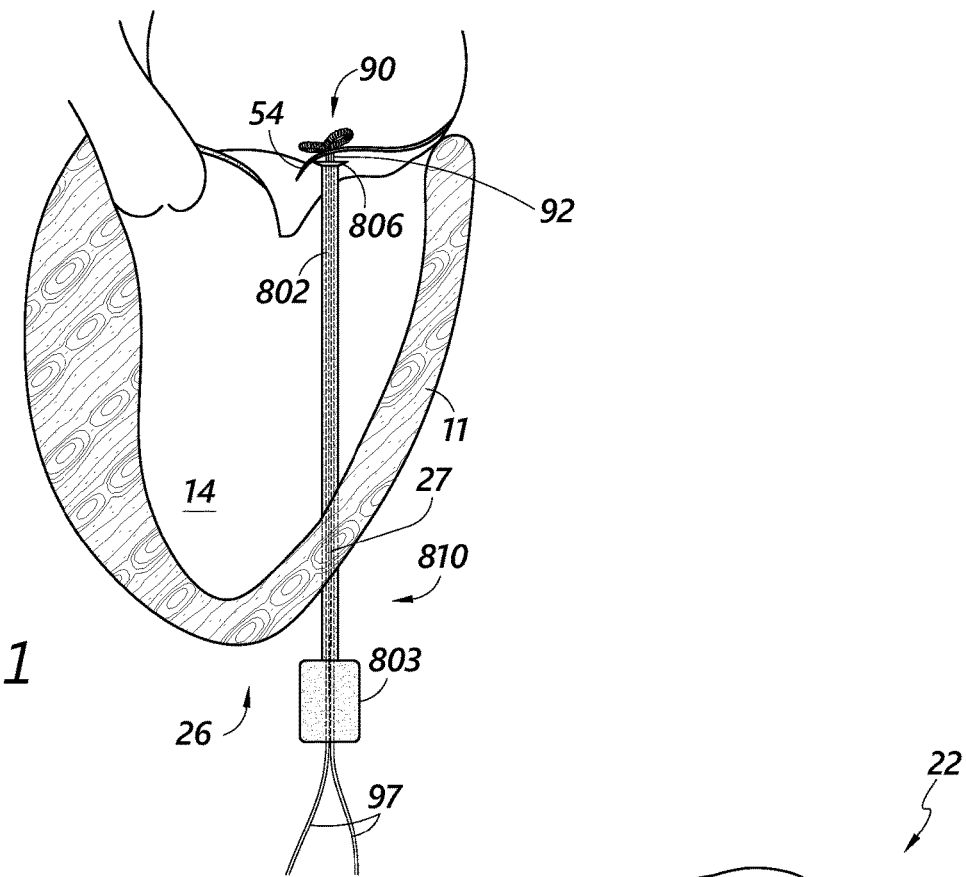
Figures 2, 10:
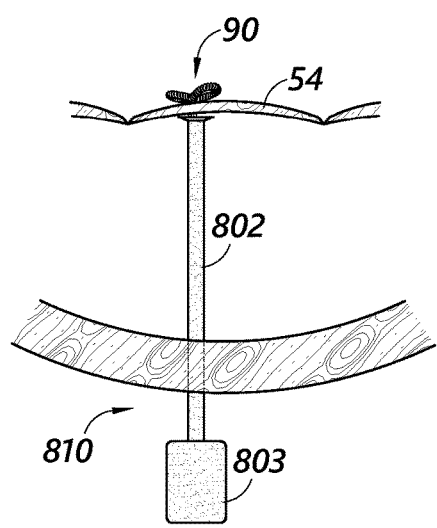
Figures 3, 10:
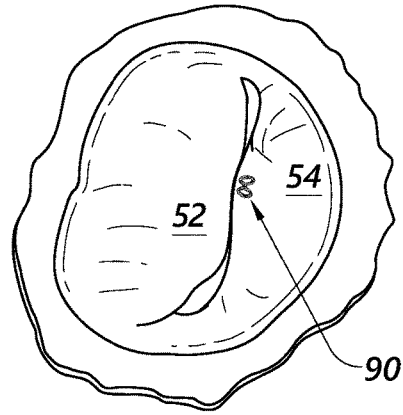

FIGS. 10-1 through 10-3, collectively referred to as FIG. 10, illustrate stages of the anchor deployment process after deployment of the first anchor 90 in accordance with one or more embodiments. In the images of FIGS. 10-1 through 10-3, an anchor guide 810 has been introduced into the heart chamber 14 and approximated or advanced to the target leaflet 54. The anchor guide 810 can be advanced over one or more of the suture portion(s) 92, 97 to a position on a proximal side of the leaflet 54 under the anchor 90 and/or substantially axially centered therewith. The anchor guide 810 comprises an elongate shaft 802, which may be inserted into the heart ventricle 14 through the access opening 27 in the heart wall 11. The access opening 27 may be the same access opening through which the introducer 820 and/or suture(s) 92 were passed in the stages shown in FIGS. 8 and 9 and described above, or the access opening 27 shown in FIG. 10 may be a separate access opening in the heart wall 11. The shaft 802 of the anchor guide 810 can be extended to contact or approximate a first location on the proximal side (e.g., underside according to the illustrated orientation of FIG. 10) of the heart valve leaflet 54, wherein at least a portion of the anchor 90 is deployed on a distal side of the leaflet 54 at or near the first location. At least a portion of the suture(s) 92 are received or disposed within a lumen or space/channel defined by the shaft 802. In some embodiments, the heart ventricle 14 can be a left ventricle. In some embodiments, the access opening 27 can be formed in the heart wall at or proximate to the apex 20 of the heart 10.

In some embodiments, the shaft 802 is placed or passed along the suture tail(s) 97, 92 that are associated with the previously-deployed anchor 90. The term "associated with" is used herein according to its broad and ordinary meaning. With respect to a suture or suture or structure being "associated with" an anchor, such terminology may refer to a suture or other component or structure being physically coupled, attached, or connected to, or integrated with, the anchor. The anchor guide 810 can maintain hemostasis through the ventricular wall 11 after insertion thereof. In some embodiments, once the anchor guide 802 is properly placed, a purse string suture may be tightened to reduce bleeding around the shaft 802 of the anchor guide.

In some embodiments, the shaft 802 of the anchor guide 810 comprises a relatively thin shaft having a central lumen, as described above in connection with FIG. 6. The shaft 802 may further comprise a substantially atraumatic tip portion 806 and/or a hub portion 803, which may comprise one or more hemostasis valves, and may be associated with a proximal end of the anchor guide 810. The atraumatic tip and/or other lumen/shaft tip or end portions disclosed herein may be at least partially flexible and/or may be configured to collapse down to fit through a lumen, such as the lumen of an introducer, wherein the tip expands after deployment from the introducer. In some embodiments, the anchor guide 810 does not include a hub portion, but rather one or more hemostasis valves are integrated with or part of the shaft 802 or other portion of the anchor guide 810 having any suitable or desirable shape. The anchor guide 810 and/or shaft 802 can comprise any rigid or semi-rigid material or combination of materials, such as stainless steel, polyethylene, or the like.

The shaft 802 may have a circular, partial-circular, semi-circular, oval, or semi-oval cross-sectional shape. The shaft 802 may be formed at least in part by shaping a sheet into a curved or circular form, or the lumen or channel thereof may be may be skived or cut-out to create the lumen or channel. In some embodiments, a separate semi-circle component can be assembled to the shaft 802 in the area intended to engage with the suture(s). The atraumatic tip 806 may be similar in certain respects to the tip/end portion of the delivery system lumen member 801 shown in FIG. 8. In some embodiments, one or more external indicators, such as geometrical or visual marker features, help facilitate orientation of the guide 810 from outside the heart and/or chest cavity.

The anchor guide 810 may be used to facilitate placement of a subsequently-deployed anchor in order to prevent undesirable clustering of anchors. For example, the guide 810 may advantageously guide the placement of anchors approximately 5 mm apart. Generally, the guide 810 may be lined-up and advanced over the first, or most-recently, deployed anchor/suture(s). In some embodiments, the process of FIGS. 8 through 13 involves selecting a desired anchor guide from among a plurality of available guides, which may be part of a common kit of anchor guides provided in a single packaging, or the like. Selection of the appropriate suture guide may be based on the relevant procedure, the target location or leaflet, or the like.

The use of an anchor guide in accordance with certain embodiments of the present disclosure may require one or more additional steps to deploy multiple leaflet anchors compared to procedures not utilizing such an anchor guide. Furthermore, for transapical leaflet access, use of an anchor guide in accordance with embodiments of the present disclosure may require a relatively wider/larger incision in the heart wall to allow access for a delivery system lumen and the anchor guide simultaneously through a single access channel. Therefore, anchor guides in accordance with embodiments of the present disclosure may be used selectively in cases in which targeting becomes difficult, such as for a final knot to be deployed where spacing is uncertain. Alternatively, a physician may choose to use an anchor guide for all anchors that are placed for a procedure, or may selectively choose to use an anchor guide for one or more sutures as needed or desired.

Figures 1, 11:
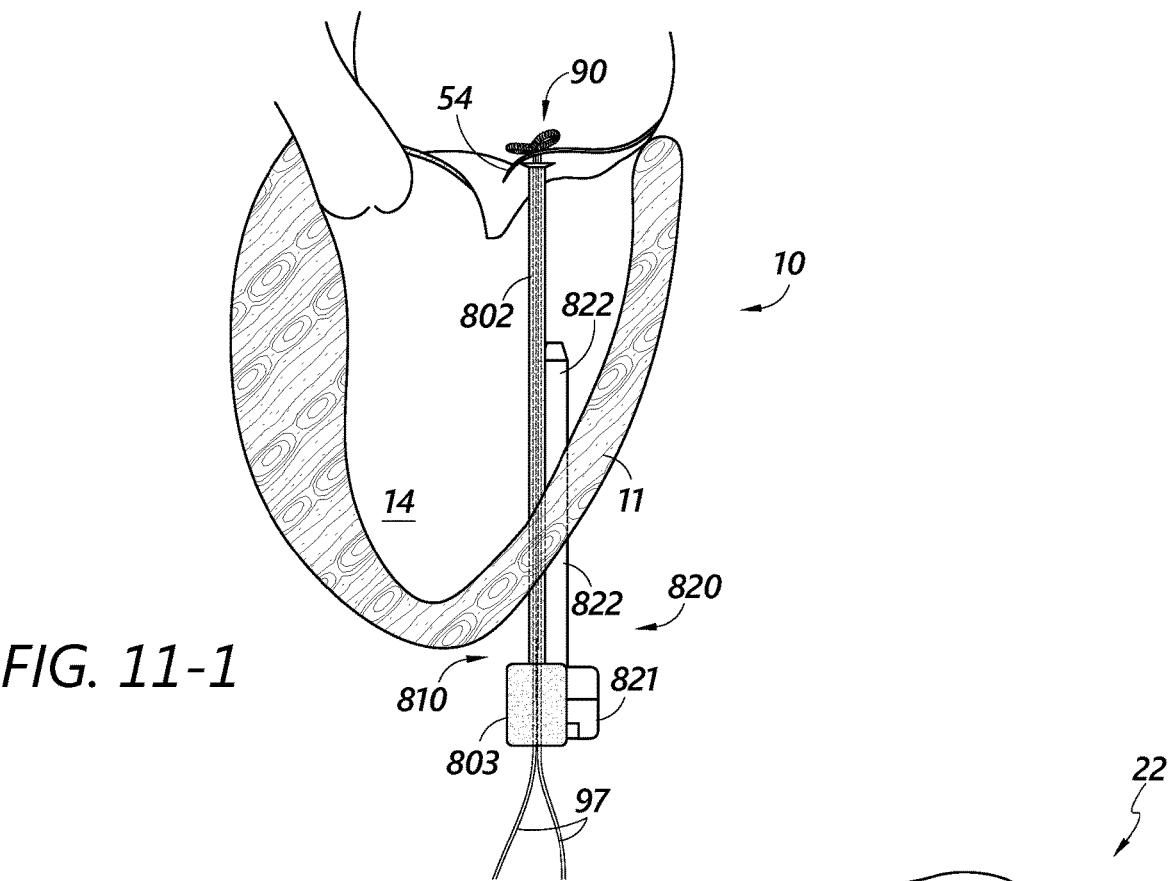
Figures 2, 11:
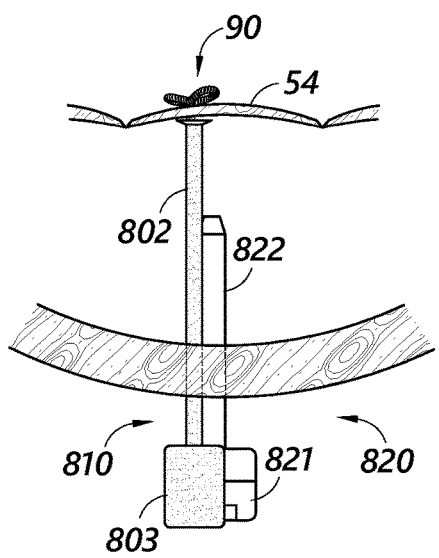
Figures 3, 11:
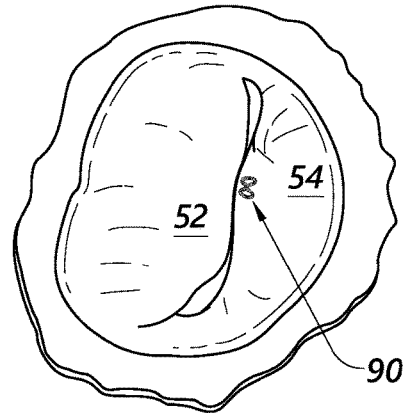

FIGS. 11-1 through 11-3, collectively referred to as FIG. 11, illustrate stages of the anchor deployment process after insertion of an introducer 820 alongside the anchor guide 810 in accordance with one or more embodiments. The introducer 820 may be advanced adjacent to anchor guide 810, whether through a common incision with the anchor guide 810 or through another incision.

As described above, after deployment of the prior anchor 90 (e.g., suture knot), the introducer 820 may be withdrawn from the associated suture portion(s) (e.g., ePTFE cord(s)). The introducer 820 may be flushed and reintroduced into the same incision. Alternatively, a different introducer device may be used in connection with the stages of FIG. 11. As shown in FIG. 11-1, the anchor guide 810 is slid over the suture(s) associated with the existing anchor 90. In embodiments in which the introducer is not previously withdrawn, the anchor guide 810 can be advanced next to the introducer lumen member 822 and to the target valve leaflet.

In some embodiments, the shaft 802 of the anchor guide 810 and/or portion(s) thereof comprise echogenic material/finish, such as grit-blasted stainless steel or the like, in order to allow for improved visualization of the location of the previously-deployed anchor 90 and/or its associated suture(s). The atraumatic tip 806 of the anchor guide 810 may be designed or configured to help ensure that the leaflet tissue is not damaged by the anchor guide 810. Generally, pushing the anchor guide against the leaflet 54 can provide additional support during the subsequent anchor deployment and improved centering of the suture(s) 92 within the channel/lumen of the shaft 802. The hemostasis valve(s) associated with the proximal end 803 of the anchor guide 810 may serve to reduce incidences of back-bleeding through the shaft 802. Furthermore, the proximal end 803 may advantageously have a wider width/thickness dimension relative to the shaft 802 and/or associated incision channel in the heart wall 11 such that when it protrudes from the heart, the end 803 at least partially prevents accidental implantation or insertion into the heart chamber 14.

In some embodiments, the initial introducer (see FIG. 8) remains implanted from the initial insertion, wherein the anchor guide shaft 802 can be inserted through the introducer, as described in detail below in connection with FIGS. 15 and 16. In some embodiments, the anchor guide 810 comprises memory metal (e.g., nitinol), wherein the guide shaft 802 can be inserted into the same aperture/channel in the introducer as the lumen member of the delivery system such that both may be present therein concurrently.

Figures 1, 12:
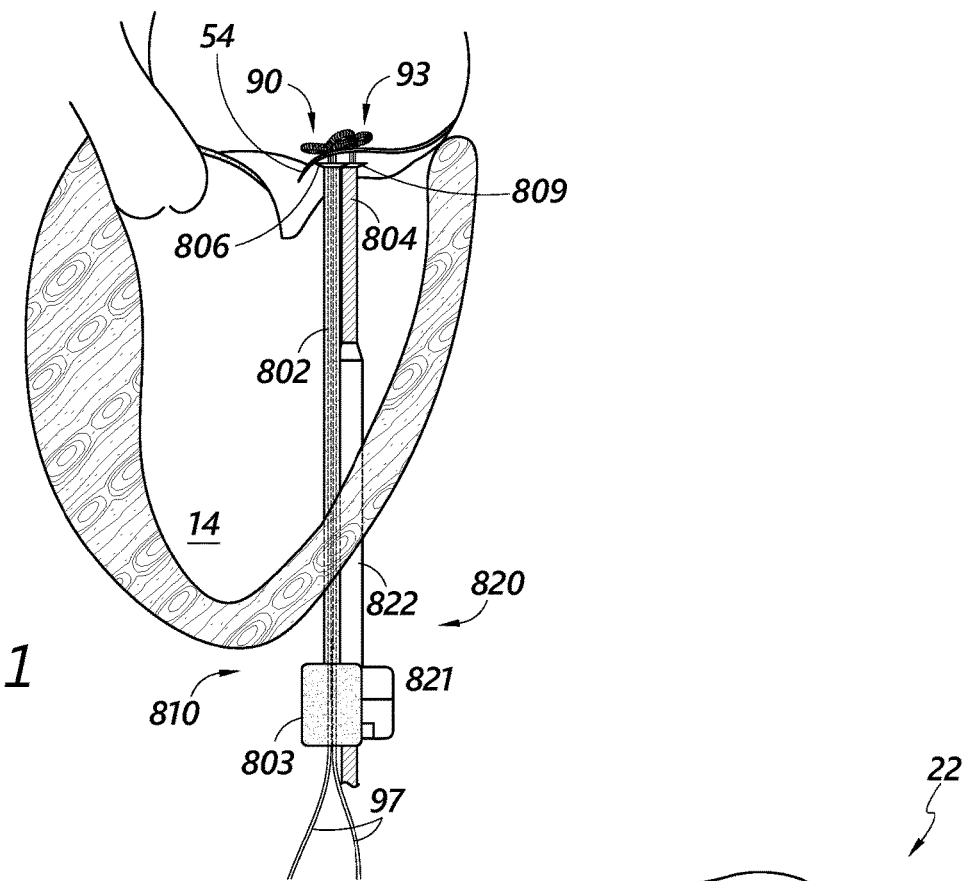
Figures 2, 12:
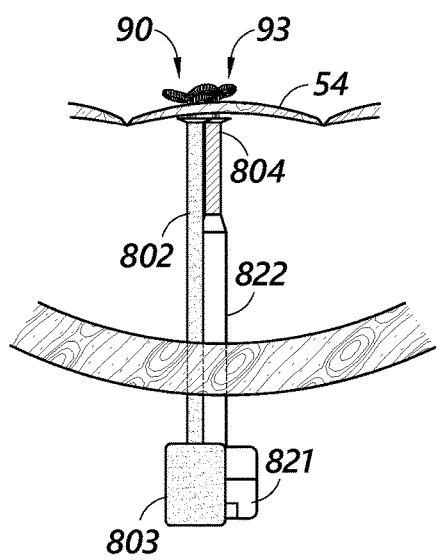
Figures 3, 12:
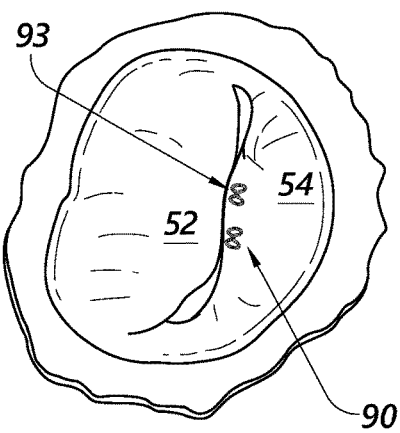

FIGS. 12-1 through 12-3, collectively referred to as FIG. 12, illustrate stages of the anchor deployment process after insertion of a delivery system lumen member 804 through the introducer 820 alongside or adjacent to the anchor guide shaft 802 in accordance with one or more embodiments.

A second anchor 93 may be deployed using the delivery system lumen member 804 adjacent to the anchor guide shaft 802, which may comprise one or more geometrical and/or dimensional features configured such that when the delivery system lumen member 804 and/or tip 809 is/are positioned in physical contact with the anchor guide shaft 802 and/or tip 806, the center of the lumen member 804 is positioned at a desired and/or pre-selected distance from the center axis of the previously-deployed anchor 90. For example, at the target leaflet, the delivery system lumen member 804/tip 809 may advantageously be in contact with a partial-/semi-circle portion of the guide shaft 802/tip 806, which may control the spacing based on the cross-sectional width or configuration of the guide shaft 802 and/or tip 806.

Once the delivery system lumen member 804 has been positioned, the anchor 93 can be deployed with desired and/or consistent spacing relative to the prior anchor 90. The anchor guide 810 may then be removed. It may be desirable for the anchor guide 810 to be relatively narrow at the base 803 and/or along a portion of the shaft 802 relative to the distal end and/or tip of the shaft 802 so as to take up minimal room in the incision or introducer channel when the anchor guide is deployed.

As described in detail herein, the lumen member 804 of the delivery system can comprise an elongate member configured to be inserted through the access opening of the introducer 820. The lumen member 804 may be extended to contact the proximal side (e.g., underside) of the heart valve leaflet 54 while contacting engagement features of the shaft 802. For example, a sliding engagement between the lumen member 804 of the anchor delivery device and the shaft 802 of the anchor guide can be maintained while the lumen member 804 of the anchor delivery device is extended toward the leaflet 54. For example, as described above in connection with FIGS. 6 and 7, the shaft 802 may comprise one or more features for the lumen member 804 to sit on or be placed against to help guide the delivery system lumen member 804 as it is advancing towards the target leaflet 54. The engagement feature(s) of the shaft 802 may comprise one or more grooves, concave or convex surfaces, notches, projections, or the like. In some embodiments, engagement feature(s) of the shaft 802 are associated with only part of the shaft, such as the end portion of the shaft. The dimensions/features of the shaft 802 of the anchor guide may provide for controlled spacing between the anchors 90, 93, such as about a 5 mm spacing, or other distance. In some embodiments, the anchor guide is used in combination with sonic imaging to provide improved precision, efficiency, and/or convenience.

The tip 806 may be a floating distal portion, wherein contact can be maintained between the distal tip 806 portion and the underside of the heart valve leaflet 54 at the location of the first anchor 90 while the lumen member 804 of the anchor delivery device is extended to contact the location of the second anchor 93. In some embodiments, contact can be maintained between the distal tip portion 806 and the underside of the heart valve leaflet 54 at the first location while the second anchor 93 is deployed. Having the distal tip portion 806 maintain contact with the heart valve leaflet 54 while extending the lumen member 804 of the anchor delivery device can facilitate maintaining a position of the leaflet, thereby improving accuracy/precision in positioning of the anchor delivery device relative to the leaflet. Having the distal tip portion 806 maintain contact with the heart valve leaflet 54 while deploying the second anchor 93 can thereby facilitate improved accuracy in deploying the second anchor 93 onto the target location on the leaflet.

Figures 1, 13:
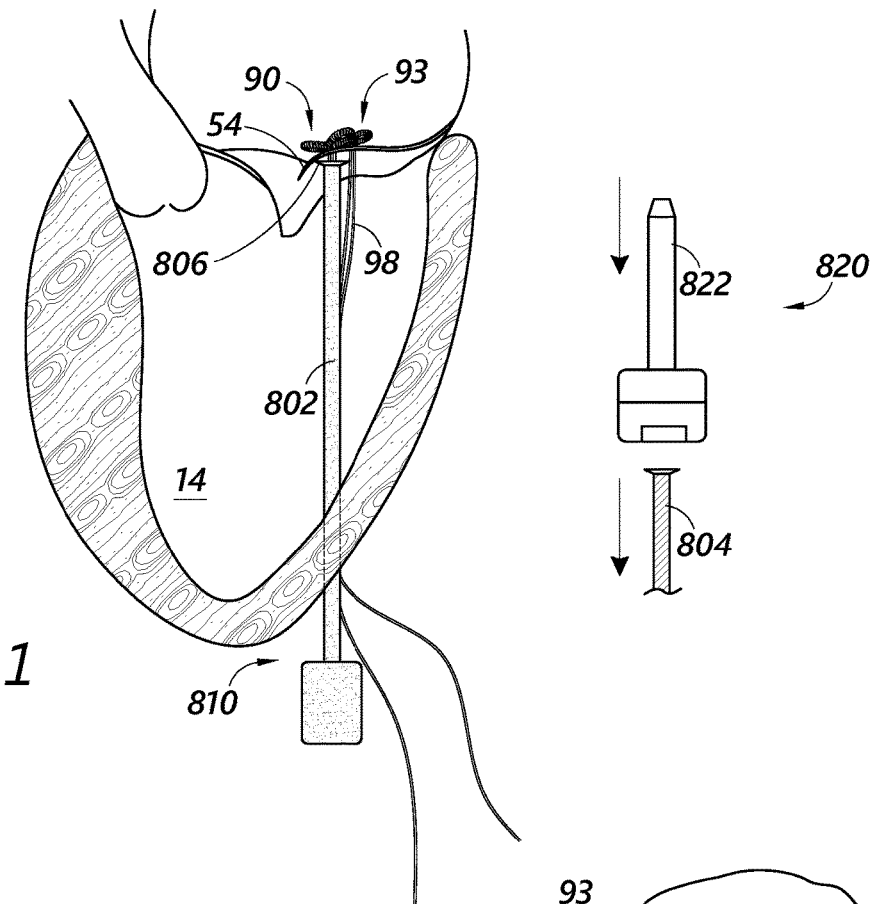
Figures 2, 13:
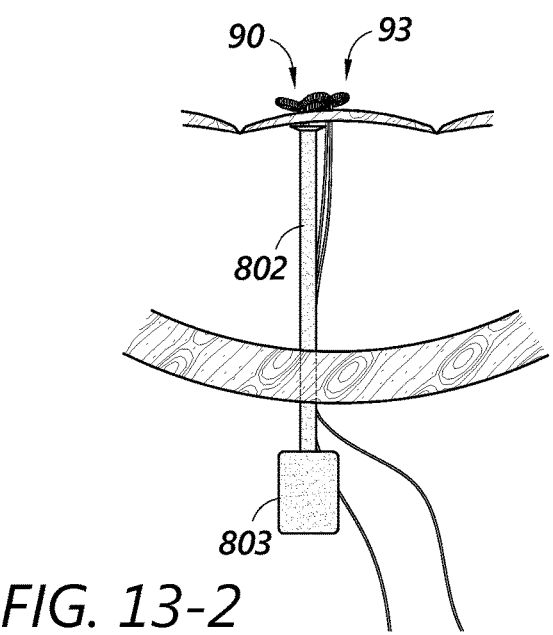
Figures 3, 13:
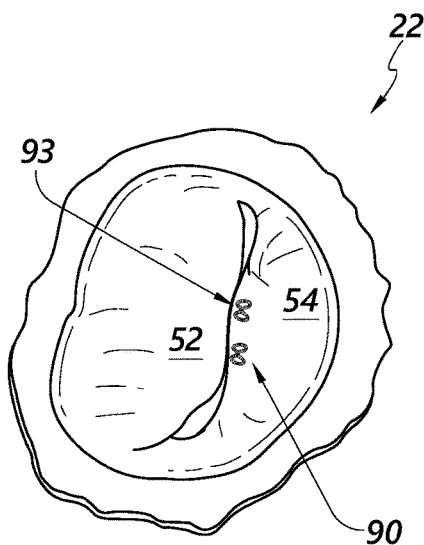

FIGS. 13-1 through 13-3, collectively referred to as FIG. 13, illustrate stages of the anchor deployment process after withdrawal of the introducer 820 and delivery system lumen member 804 from the heart chamber 14 in accordance with one or more embodiments. The introducer 820 and delivery system may be removed following deployment of the anchor 93. Furthermore, as shown, the suture tails 98 associated with the anchor 93 may be withdrawn from the delivery system.

As described above, the second anchor 93 can be deployed using the anchor delivery device, wherein a distance between the location of the first anchor 90 and the location of the second anchor 93 can be dependent on a width of at least a portion of the elongate shaft 802 and/or tip 806 of the anchor guide 810. In some embodiments, the elongate shaft 802 of the anchor guide 810 can have a semi-circle shape. For example, the width of the shaft 802 can be a diameter of the semi-circle shape.

The anchors deployed onto the heart valve leaflet can be suture knot anchors formed from suture windings. The suture tails associated with such suture knots may be used to tether the heart valve leaflet to the heart wall. Use of the anchor guide in combination with the anchor delivery device can facilitate reliable spacing between adjacent suture knots deployed onto a mitral valve leaflet so as to achieve desired mitral valve repair to address mitral valve regurgitation. For example, adjacent suture knots can be at a distance of about 5 mm apart.

As described, the anchor guide 810 can be used in combination with the anchor delivery device to consecutively deploy one or more additional anchors onto a valve leaflet after deployment of the first anchor 90. In some embodiments, such deployment is performed without sonic guidance. In some embodiments, the anchor guide 810 may be used in combination with the anchor delivery device to deploy only a last anchor of a plurality of anchors deployed onto the valve leaflet. For example, previously-deployed anchors can be positioned using traditional techniques without an anchor guide as described herein, wherein only the last suture is deployed using an anchor guide.

The above-described procedures can be performed manually (e.g., by a physician) or can alternatively be performed fully or in part using robotic or machine assistance. For example, in some embodiments, an anchor delivery device and/or anchor guide can be configured to be delivered and deployed automatically using one or more robotic mechanisms/devices.

Figure 14:
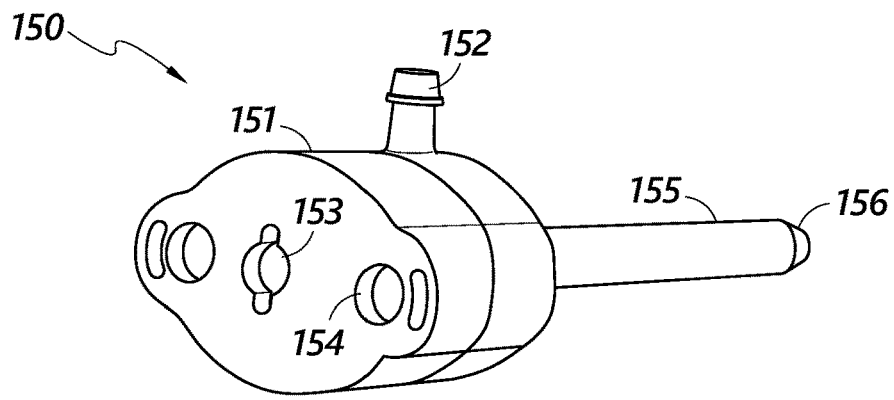
FIG. 14 is a perspective view of a surgical introducer device in accordance with one or more embodiments.

FIG. 14 is a perspective view of a surgical introducer device 150 in accordance with one or more embodiments. The introducer device 150 provides a conduit into a target surgical area or chamber. In some embodiments, the introducer 150 comprises one or more hemostasis valves associated with a channel port 153. Such hemostasis valve may comprise silicone or other flexible material configured to keep blood from flowing out of the channel port 153.

In some embodiments, the introducer 150 comprises a hub body 151, which may include a port 152 used to de-air the introducer 150 prior to use and/or connect a fluid flush during medical procedures. The hub body 151 may be used to secure the introducer 150 to the pericardium for stable entry of a delivery system (not shown) and/or to control the amount of bleed-back during a medical procedure. The channel port 153 may serve as a delivery system lumen member insertion port, wherein an inserted delivery system lumen member may pass through a lumen member 155 of the introducer 150 and out a distal end 156 thereof for access to the target chamber. The channel port 153 may further be dimensioned to accommodate insertion of a dilator device (not shown) used to guide the introducer into the target chamber (e.g., left ventricle, off-apex). The distal end 156 of the introducer may have a tapered shape to seal against the delivery system lumen.

Figure 15:
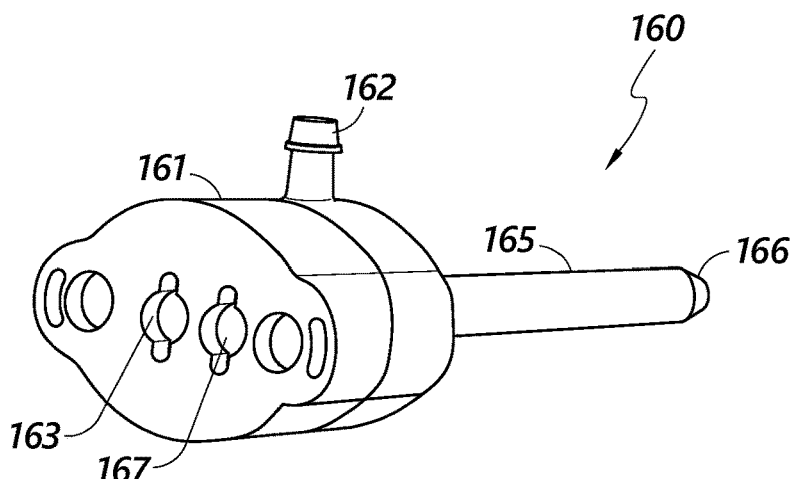
FIG. 15 is a perspective view of a surgical introducer device in accordance with one or more embodiments.

FIG. 15 is a perspective view of a surgical introducer device 160 in accordance with one or more embodiments. In some embodiments, the introducer 160 comprises a hub body 161, which may include a port 162 used to de-air the introducer 150 prior to use and/or connect a fluid flush during medical procedures. The introducer 160 comprises a first channel insertion port 163 associated with a lumen member 165 of the introducer 160 for insertion of a lumen member of a delivery system and/or a dilator device, as well as a second insertion port 167 for insertion of an anchor guide shaft in accordance with embodiments of the present disclosure. An inserted delivery system lumen member may pass through the lumen member 165 of the introducer 160 and out a distal end 166 thereof for access to the target chamber. The distal end 166 of the introducer may have a tapered shape to seal against the delivery system lumen. In some embodiments, the anchor guide is introduced using the same introducer lumen member 165, or the anchor guide may come out separately from hub 161 and have its own hemostasis valve within its lumen. Therefore, in some embodiments, a separate hemostasis valve for the anchor guide may be unnecessary and/or omitted. Each of the insertion ports 163, 167 may be associated with a separate hemostasis valve. The introducer 160 may have a generally oval-shaped hub body 161, wherein such shape may be leveraged to include the multiple insertion ports.

By using an introducer device with multiple insertion ports, including an insertion port dimensioned for insertion of an anchor guide shaft in accordance with embodiments of the present disclosure, it may be possible to perform controlled-spacing anchor deployment processes as described herein without requiring withdrawal of the originally-inserted introducer device. For example, in some embodiments, the anchor guide is at least partially flexible to allow insertion thereof without requiring withdrawal of the originally-inserted introducer.

Figure 16:
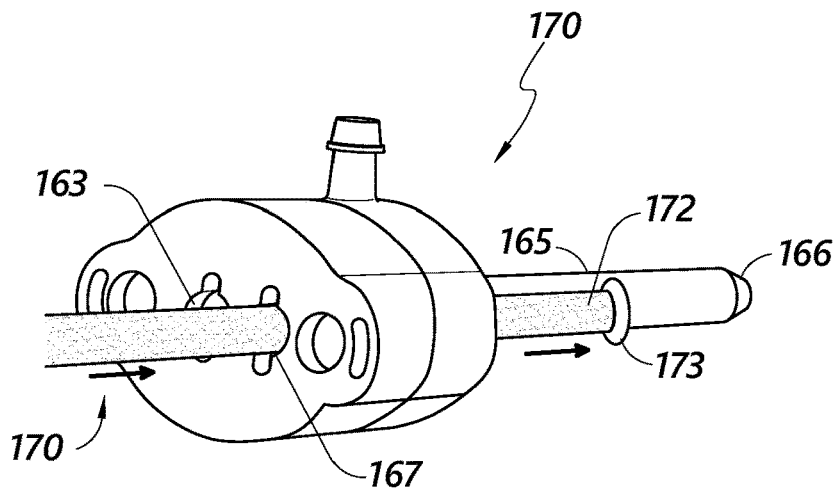
FIG. 16 is a perspective view of a surgical introducer device in accordance with one or more embodiments.

FIG. 16 is a perspective view of the surgical introducer device 160 in accordance with one or more embodiments. FIG. 16 shows a shaft 172 of an anchor guide 170 in accordance with embodiments of the present disclosure inserted through the separate insertion port 167. The shaft 172 can comprise a distal tip 173 comprising one or more features as described herein. Although FIG. 16 shows the insertion port 167 and lumen member 165 configured such that an inserted guide shaft 172 does not pass through the lumen member 165, in some embodiments, the lumen member 165 is large enough and configured to allow for passage of a delivery system lumen member and anchor guide shaft therethrough.

Figure 17:
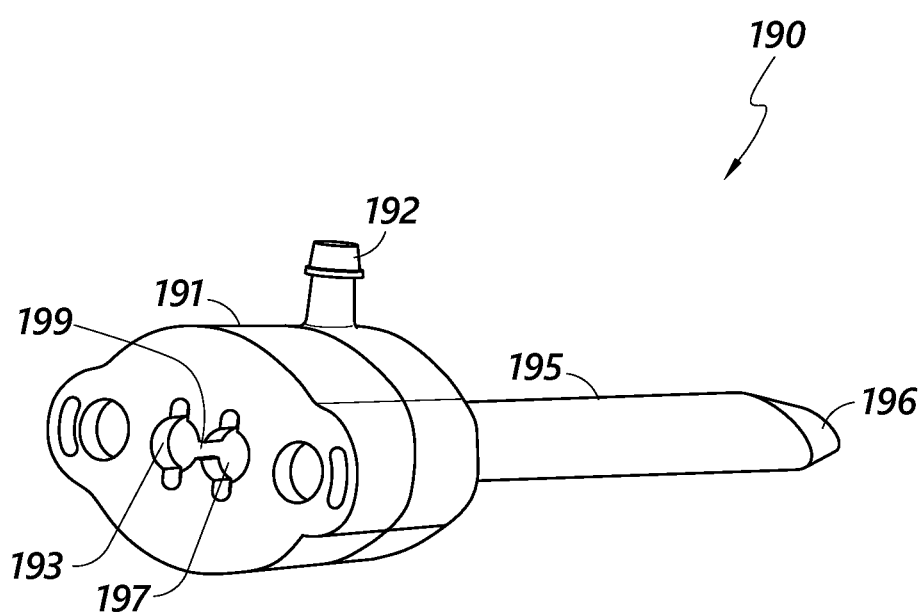
FIG. 17 is a perspective view of a surgical introducer device in accordance with one or more embodiments.

FIG. 17 is a perspective view of a surgical introducer device 190 in accordance with one or more embodiments. In some embodiments, the introducer 190 comprises a hub body 191, which may include a port 192 used to de-air the introducer 190 prior to use and/or connect a fluid flush during medical procedures. The introducer 190 comprises a first channel insertion port 193 associated with a lumen member 195 of the introducer 190 for insertion of a lumen member of a delivery system, an anchor guide shaft, and/or a dilator device, as well as a second insertion port 197 for insertion of a lumen member of a delivery system, an anchor guide shaft, and/or a dilator device in accordance with embodiments of the present disclosure. In the embodiment of FIG. 17, the insertion port 197 is also associated with the lumen member 195, such that a shaft or lumen member inserted into the port 197 is channeled within the lumen member 195 in a sub-channel thereof. Each of the insertion ports 193, 197 may advantageously have or be associated with a separate hemostasis valve. The introducer 190 may have a generally oval-shaped hub body 191, wherein such shape may be leveraged to include the multiple insertion ports.

By using an introducer device with multiple insertion ports, including an insertion port dimensioned for insertion of an anchor guide shaft in accordance with embodiments of the present disclosure, it may be possible to perform controlled-spacing anchor deployment processes as described herein without requiring withdrawal of the originally-inserted introducer device. For example, in some embodiments, the anchor guide is at least partially flexible to allow insertion thereof without requiring withdrawal of the originally-inserted introducer.

The lumen member 195 of the introducer 190 is advantageously large enough and configured/shaped to allow for passage of a delivery system lumen member and anchor guide shaft therethrough. In some embodiments, an inserted delivery system lumen member and/or guide shaft may pass through a lumen member 195 of the introducer 190 and out a distal end 196 thereof for access to the target chamber. The distal end 196 of the introducer may have a tapered shape to seal against the delivery system lumen. In some embodiments, a thin channel 199 between insertion ports 193 and 197 extends through the hub 191 and/or the length of the inside lumen member 195, thereby providing an opening/passage for suture tails to pass between the separate sub-lumens/channels associated with the ports 193, 197, respectively. For example, it may be desirable for the lumen member 195 to accommodate both the anchor guide and the delivery system in respective ones of the ports 193, 197. In implementations in which suture tails from a previously-deployed knot are disposed within, and run the length of, one of the insertion ports (e.g., 193) and associated sub-channel, it may be desirable for the anchor guide to be inserted over the suture tail(s). For example, in some embodiments, a process for implementing suture anchoring using the introducer 190 involves inserting a delivery system lumen into the port 193 (or port 197) to deploy a first anchor, after which the delivery system may be withdrawn from the introducer 190. The process may further involve inserting an anchor guide shaft into the port 193 (or port 197) over the suture tail(s) associated with the previously-deployed anchor. The process may further involve subsequently inserting a new delivery system lumen (or re-inserting the previously-used delivery system lumen) into the port 197 (or port 193) adjacent to the anchor guide shaft and deploying another suture anchor at a spacing and/or position against the distal end of the anchor guide shaft. After the second suture anchor has been deployed, the process may involve withdrawing the delivery system used to deploy the second suture, as well as the anchor guide shaft. The suture tail(s) may be guided through the channel 199 between the ports 193, 197, after which the anchor guide may be inserted into the port 193 (or port 197) over the suture tail(s) associated with the second suture anchor. These steps may be repeated until the desired number of knots have been deployed.

FIG. 18 is a close-up view of a suture spacing system 1700 in accordance with one or more embodiments. The suture spacing system includes an anchor delivery device 180 having a wire (or suture) 185 attached thereto. In some embodiments, the wire includes a collar portion 186 and a loop portion 181. The wire 185 may be configured such that a tail portion 188 thereof may be manipulated (e.g., pushed and/or pulled) in order to cause the loop 181 to be expanded and/or contracted. The wire tail portion 188 may be disposed at least partially within, and extend down, a lumen 182 of the delivery device 180. The loop 181 may be pre-formed and may be configured to be passed through a lumen of an introducer device in a collapsed, compressed, contracted, or other configuration, wherein the loop 181 may be expanded or extended once deployed from the introducer.

The loop 181 may advantageously provide spacing guidance for deployment of a leaflet anchor, as described in detail herein. For example, the loop 181 may be routed or threaded over previously-deployed suture tail(s) 183, wherein a dimension 'z' of the loop determines a distance 'y' between a central axis of the delivery device 180 and the deployed suture(s) 183. Although FIGS. 18-20 illustrate a single loop, it should be understood that the loop 181 may have one or more additional loops or spacing features. For example, an additional loop or feature configured to maintain the sutures 183 at or near a far side 184 of the loop 181 with respect to the anchor delivery device 180. In some embodiments, the loop 181 is comprised of a stiffener tab in addition to, or instead of, the illustrated loop. Such a stiffener tab may comprise an opening on the far side 184 to keep the sutures 183 in place.

FIG. 19 is a top view of the suture spacing system 1700 in accordance with one or more embodiments. FIG. 19 shows an example configuration of the loop 181 around and retaining/maintaining the suture(s) 183. FIG. 20 is a side view of the suture spacing system and associated anatomy (e.g., heart valve leaflet 187) in accordance with one or more embodiments. An anchor (e.g., suture knot) 189 is shown as being associated with the sutures 183. Although the suture spacing system 1700 is shown as comprising a wire/suture loop, in some embodiments, the suture spacing system may implement another structure through which suture(s) may be routed to provide spacing therefrom, such as a tab or other structure having an opening therein. Such a feature may be configured with a hinge or other similar feature allowing the spacer to swing out once deployed and be passed through a lumen in a collapsed/contracted state. In some embodiments, suture/anchor spacing is achieved using a delivery system having an inflatable balloon feature. Alternatively, spacing may be achieved using a tether connected to a previously-deployed suture or anchor.

Although the above-described methods and/or devices are described primarily with reference to mitral valve repair, it will be understood that the methods and/or devices can be applicable to repair of other heart valves, such as the tricuspid valve.

Additional Embodiments and Terminology

Certain standard anatomical terms of location are used herein to refer to the anatomy of animals, and namely humans, with respect to the preferred embodiments. Although certain spatially relative terms, such as "outer," "inner," "upper," "lower," "below," "above," "vertical," "horizontal," "top," "bottom," and similar terms, are used herein to describe a spatial relationship of one device/element or anatomical structure to another device/element or anatomical structure, it is understood that these terms are used herein for ease of description to describe the positional relationship between element(s)/structures(s), as illustrated in the drawings. Spatially relative terms are intended to encompass different orientations of the element(s)/structures(s), in use or operation, in addition to the orientations depicted in the drawings. For example, an element/structure described as "above" another element/structure may represent a position that is below or beside such other element/structure with respect to alternate orientations of the subject patient or element/structure, and vice-versa.

Furthermore, references may be made herein to certain anatomical planes, such as the sagittal plane, or median plane, or longitudinal plane, referring to a plane parallel to the sagittal suture, and/or other sagittal planes (e.g., para-sagittal planes) parallel thereto. In addition, "frontal plane," or "coronal plane," may refer to an X-Y plane that is perpendicular to the ground when standing, which divides the body into back and front, or posterior and anterior, portions. Furthermore, a "transverse plane," or "cross-sectional plane," or horizontal plane, may refer to an X-Z plane that is parallel to the ground when standing, that divides the body in upper and lower portions, such as superior and inferior. A "longitudinal plane" may refer to any plane perpendicular to the transverse plane. Furthermore, various axes may be described, such as a longitudinal axis, which may refer to an axis that is directed towards head of a human in the cranial direction and/or directed towards inferior of a human in caudal direction. A left-right or horizontal axis, which may refer to an axis that is directed towards the left-hand side and/or right-hand side of a patient. An antero-posterior axis which may refer to an axis that is directed towards the belly of a human in the anterior direction and/or directed towards the back of a human in the posterior direction. While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

The present disclosure describes various features, no single one of which is solely responsible for the benefits described herein. It will be understood that various features described herein may be combined, modified, or omitted, as would be apparent to one of ordinary skill Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A tissue-anchoring system comprising:
   an anchor delivery device configured to deploy a first tissue anchor at a first location in a heart valve leaflet, the anchor delivery device comprising a first elongate shaft configured for advancement of the first tissue anchor therethrough; and
   an anchor guide comprising a second elongate shaft configured to be advanced over a suture tail tethered to the heart valve leaflet via the first tissue anchor, the suture tail being disposed within a channel defined by the second elongate shaft, the second elongate shaft including:
   one or more engagement features configured to provide sliding engagement between the second elongate shaft of the anchor guide and the first elongate shaft of the anchor delivery device; and
   a flexible, atraumatic tip including a flat distal contact surface, the contact surface having a shape of a partial ring with a cut-out segment configured to accommodate an end effector of the first elongate shaft of the anchor delivery device when the anchor guide and the anchor delivery device are in a side-by-side configuration;
   wherein a dimension of the anchor guide controls a lateral distance between the first tissue anchor and a second tissue anchor in a configuration in which the first elongate shaft of the anchor delivery device is disposed against the one or more engagement features of the second elongate shaft.

2. The tissue-anchoring system of claim 1, wherein:
   the second elongate shaft has a semi-circle cross-sectional shape with a flat sidewall portion and a circular sidewall portion; and
   the one or more engagement features comprises:
   a first flange disposed at a first junction between the circular sidewall portion and the flat sidewall portion, the first flange projecting in a first plane that is perpendicular to the flat sidewall portion; and
   a second flange disposed at a second junction between the circular sidewall portion and the flat sidewall portion on an opposite side of the flat sidewall portion from the first junction, the second flange projecting in a second plane that is perpendicular to the flat sidewall portion.

3. The tissue-anchoring system of claim 2, wherein each of the first and second flanges terminate before a distal end of the flat sidewall portion, such that a distal portion of the flat sidewall portion is free of the one or more engagement features.

4. The tissue-anchoring system of claim 2, wherein each of the first and second flanges has a distally-facing curved ramp terminus.

5. The tissue-anchoring system of claim 1, wherein the lateral distance between the first tissue anchor and the second tissue anchor is approximately 5 millimeters (mm).

6. The tissue-anchoring system of claim 1, wherein:
   the one or more engagement features comprise a pair of opposing flanges extending from at least a portion of a length of the second elongate shaft; and
   the first elongate shaft of the anchor delivery device is shaped to be positioned between, and in contact with, the pair of opposing flanges.

7. The tissue-anchoring system of claim 1, wherein the second elongate shaft is configured as a floating shaft biased in a distal direction such that a distal tip of the second elongate shaft automatically extends and retracts in response to cyclical movement of the heart valve leaflet to maintain contact with the heart valve leaflet.

8. The tissue-anchoring system of claim 1, wherein the channel defined by the second elongate shaft is a closed channel that extends along an entire length of the second elongate shaft.

9. The tissue-anchoring system of claim 1, wherein an outer surface of the second elongate shaft of the anchor guide comprises bead-blasted stainless steel to provide an echogenic surface for the anchor guide.

10. A tissue-anchoring system comprising:
    a tissue anchor delivery device including:
    a handle;
    a first elongate shaft dimensioned to extend between a ventricular side of a heart valve leaflet of a heart of a patient and an exterior of the patient through a percutaneous access path; and
    means for deploying a tissue anchor from a distal axial opening of the first elongate shaft, the tissue anchor having one or more suture tails associated therewith that are disposed at least in part within the first elongate shaft;

an anchor guide including:
- a second elongate shaft separate from the first elongate shaft and including one or more guide rails configured to engage with, and position, the first elongate shaft of the tissue anchor delivery device in a side-by-side arrangement wherein the one or more guide rails are configured to maintain a preset distance between the first elongate shaft and the second elongate shaft in the side-by-side arrangement; and a surgical introducer including:
- a hub body;
- a third elongate shaft;
- a first insertion port aligned with, and providing access to, an internal lumen of the third elongate shaft and dimensioned to receive the first elongate shaft for passage through the third elongate shaft; and
- a second insertion port offset from the first insertion port, the second insertion port being dimensioned to receive the second elongate shaft through the hub body and position the second elongate shaft in a side-by-side position relative to the first elongate shaft when the first elongate shaft is disposed through the first insertion port.

11. The tissue-anchoring system of claim 10, wherein:
the first insertion port is in a central position on the hub body; and
the second insertion port is in an off-center position on the hub body.

12. The tissue-anchoring system of claim 10, wherein the second insertion port does not provide access to the internal lumen of the third elongate shaft, such that advancement of the second elongate shaft through the second insertion port positions a distal end of the second elongate shaft outside of the surgical introducer adjacent to an outer surface of the third elongate shaft on a distal side of the hub body.

13. The tissue-anchoring system of claim 10, wherein:
the first insertion port has a first hemostasis valve; and
the second insertion port has a second hemostasis valve separate from the first hemostasis valve.

14. The tissue-anchoring system of claim 10, wherein:
the one or more guide rails includes first and second guide rails positioned on opposite sides of a flat sidewall portion of the second elongate shaft; and
each of the first and second guide rails projects in a plane tangent to a circular-cylindrical sidewall portion of the second elongate shaft at a respective junction between the flat sidewall portion and the circular-cylindrical sidewall portion.

* * * * *